US012724178B2

(12) United States Patent
Sukigara et al.

(10) Patent No.: US 12,724,178 B2
(45) Date of Patent: Sep. 1, 2026

(54) LIGHT DIFFUSION SHEET, BACKLIGHT UNIT, LIQUID CRYSTAL DISPLAY DEVICE, INFORMATION APPARATUS, AND METHOD FOR MANUFACTURING LIGHT DIFFUSION SHEET

(71) Applicant: KEIWA Incorporated, Tokyo (JP)

(72) Inventors: Masayuki Sukigara, Tokyo (JP); Akira Furuta, Tokyo (JP)

(73) Assignee: KEIWA Incorporated, Tokyo (JP)

( * ) Notice: Subject to any disclaimer, the term of this patent is extended or adjusted under 35 U.S.C. 154(b) by 211 days.

(21) Appl. No.: 18/652,702

(22) Filed: May 1, 2024

(65) Prior Publication Data

US 2024/0345294 A1 Oct. 17, 2024

Related U.S. Application Data

(63) Continuation of application No. PCT/JP2022/040810, filed on Oct. 31, 2022.

(30) Foreign Application Priority Data

Nov. 2, 2021 (JP) ................................ 2021-179472
Apr. 7, 2022 (JP) ................................ 2022-063753

(51) Int. Cl.
*G02B 5/02* (2006.01)
*B32B 3/30* (2006.01)
(Continued)

(52) U.S. Cl.
CPC ................. *G02B 5/02* (2013.01); *B32B 3/30* (2013.01); *B32B 27/365* (2013.01);
(Continued)

(58) Field of Classification Search
CPC .... G02B 5/02; G02B 5/0268; G02F 1/133606
(Continued)

(56) References Cited

U.S. PATENT DOCUMENTS

2003/0035231 A1 2/2003 Epstein et al.
2003/0058553 A1 3/2003 Epstein et al.
(Continued)

FOREIGN PATENT DOCUMENTS

CN 201795425 U 4/2011
CN 107531920 A 1/2018
(Continued)

OTHER PUBLICATIONS

Machine_English_translation_JP_2010160438_A; Takizawa, Lens Sheet, Back Light Unit and Display Apparatus; Jul. 22, 2010; EPO; whole document (Year: 2026).*
(Continued)

*Primary Examiner* — Tahseen Khan
(74) *Attorney, Agent, or Firm* — JCIPRNET

(57) ABSTRACT

A light diffusion sheet 43 includes a polycarbonate resin including a first structural unit derived from a dihydroxy compound represented by the following formula (1). The light diffusion sheet 43 includes, at least in its first surface 43*a*, recesses 22 formed in a substantially inverted polygon pyramid or in a substantially inverted truncated polygon pyramid. The ridge 23 parting the recesses 22 has a recessed shape between the intersections 23*a*. A ratio Wr/P is 0.3 or less, where P is the arrangement pitch of the recesses 22 and Wr is the dimension occupied by a curved portion at the top portion of the ridge 23 in the arrangement direction of the recesses 22. The maximum height difference d between the
(Continued)

ridge 23 and the straight line connecting the intersections 23*a* is 1 μm or more and 10 μm or less.

(1)

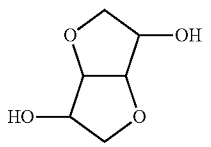

17 Claims, 14 Drawing Sheets

(51) Int. Cl.
*B32B 27/36* (2006.01)
*G02F 1/13357* (2006.01)

(52) U.S. Cl.
CPC ..... *G02B 5/0268* (2013.01); *G02F 1/133606* (2013.01); *B32B 2307/414* (2013.01); *B32B 2457/202* (2013.01)

(58) Field of Classification Search
USPC .......................................................... 428/156
See application file for complete search history.

(56) References Cited

U.S. PATENT DOCUMENTS

| | | | | |
|---|---|---|---|---|
| 2005/0024754 | A1 | 2/2005 | Epstein et al. | |
| 2008/0049341 | A1 | 2/2008 | Epstein et al. | |
| 2009/0316430 | A1* | 12/2009 | Chuang | G02B 5/045 362/606 |
| 2010/0124047 | A1* | 5/2010 | Ahn | G02F 1/133603 362/97.3 |
| 2010/0190953 | A1 | 7/2010 | Fuji et al. | |
| 2011/0257362 | A1 | 10/2011 | Fuji et al. | |
| 2014/0293190 | A1* | 10/2014 | Nakashima | G02B 6/0043 362/624 |
| 2014/0296473 | A1 | 10/2014 | Fuji et al. | |
| 2015/0234113 | A1* | 8/2015 | Nakashima | G02B 6/0036 362/619 |
| 2015/0234114 | A1* | 8/2015 | Nakashima | G02B 6/0036 362/619 |
| 2016/0215165 | A1* | 7/2016 | Arakawa | C08J 5/18 |
| 2018/0207907 | A1* | 7/2018 | Okabe | G02B 5/0226 |

FOREIGN PATENT DOCUMENTS

| | | | | | |
|---|---|---|---|---|---|
| EP | 2371877 | A1 | | 10/2011 | |
| EP | 2789640 | A1 | | 10/2014 | |
| JP | 2004-538506 | A | | 12/2004 | |
| JP | 2007-178875 | A | | 7/2007 | |
| JP | 2008-024919 | A | | 2/2008 | |
| JP | 2010-117707 | A1 | | 5/2010 | |
| JP | 2010160438 | A | * | 7/2010 | |
| JP | 2011-021171 | A | | 2/2011 | |
| JP | 2011-227231 | A | | 11/2011 | |
| JP | 2012-047912 | A | | 3/2012 | |
| JP | 5-019746 | B2 | | 9/2012 | |
| JP | 2013-225058 | A | | 10/2013 | |
| TW | 202138194 | A | * | 10/2021 | G02F 1/133606 |
| WO | WO 2006/109818 | A1 | | 10/2006 | |
| WO | WO 2016/171194 | A1 | | 10/2016 | |
| WO | WO 2018/164088 | A1 | | 9/2018 | |

OTHER PUBLICATIONS

Machine_English_translation_TW_202138194_A; Tsai et. al., Light-Diffusing Laminate backlight unit and liquid crystal display device ; Oct. 16, 2021; EPO; whole document (Year: 2026).*

Extended European Search Report for EP Patent Application No. 22889943.1 dated Feb. 11, 2025 (7 pages).

International Search Report and Written Opinion for International Application No. PCT/JP2022/040810 (ISA/JP) mailed Dec. 27, 2022 w/English translation (12 pages).

* cited by examiner

| | EVALUATION OF SAMPLES AFTER SCRATCH RESISTANCE TEST | | | |
|---|---|---|---|---|
| | FIXED SAMPLE (SURRACE WITH INVERTED QUADRANGULAR PYRAMID) | | MOVING SAMPLE (MATTE SURFACE) | |
| | PHOTOGRAPHS | EVALUATION | PHOTOGRAPHS | EVALUATION |
| Example 1 |  | B |  | AA |
| Example 2 |  | A |  | AA |
| Example 3 |  | A |  | AA |
| Comparative Example 1 |  | × |  | AA |

LIGHT DIFFUSION SHEET, BACKLIGHT UNIT, LIQUID CRYSTAL DISPLAY DEVICE, INFORMATION APPARATUS, AND METHOD FOR MANUFACTURING LIGHT DIFFUSION SHEET

CROSS REFERENCE TO RELATED APPLICATIONS

This application is a bypass continuation of International Application No. PCT/JP2022/040810, filed Oct. 31, 2022, which international application claims priority to and the benefit of Japanese Application No. 2021-179472, filed Nov. 2, 2021, and Japanese Application No. 2022-063753, filed Apr. 7, 2022; the contents of all of which are hereby incorporated by reference herein in their respective entireties.

BACKGROUND

The present disclosure relates to a light diffusion sheet, a backlight unit, a liquid crystal display device, an information apparatus, and a method for manufacturing the light diffusion sheet, and particularly relates to a light diffusion sheet which uses polycarbonate resins obtained from biomass resources and is excellent in luminance uniformity and scratch resistance.

In consideration of the environment, polycarbonate resins using ether group-containing diols typified by isosorbide, a plant-derived raw material, have been developed. A polycarbonate resin using isosorbide is known for its excellence in heat resistance, weather resistance, impact resistance, and scratch resistance, and is being applied to, for example, interior and exterior parts of automobiles.

In recent years, liquid crystal display devices (hereinafter referred to as liquid crystal displays in some cases) have been widely used as display devices for various information apparatuses such as smartphones and tablet terminals. A major type of a backlight of a liquid crystal display is a direct type in which light sources are arranged on a back surface of a liquid crystal panel, or an edge light type in which light sources are arranged near a side surface of a liquid crystal panel.

In a case of adopting the direct type backlight, a light diffusion member (a light diffusion plate, a light diffusion sheet, or a light diffusion film) is used to avoid making the light sources themselves such as light emitting diodes (LEDs) traceable through a light-emitting surface and improving uniformity of in-plane luminance.

A direct type backlight disclosed in Japanese Unexamined Patent Publication No. 2010-117707 (Patent Document 1) uses a light diffusion plate including a plurality of recesses having an inverted polygon pyramid shape (inverted pyramid shape) or an inverted truncated polygon pyramid shape, in order to improve uniformity of luminance. Patent Document 1 discloses a layered structure of a light diffusion plate and another optical film, and that an inner side surface at an opening edge portion of a recess of the light diffusion plate is formed into a curved surface with a curvature center being on a depth direction side of the recess, in order to prevent the light diffusion plate or the other optical film from being worn and damaged due to vibration during transportation.

SUMMARY

However, the direct type backlight disclosed in Patent Document 1 cannot sufficiently reduce damages to the light diffusion plate and other optical films. Further, products such as liquid crystal displays are also required to be environmentally friendly.

Therefore, it is an object of the present disclosure to provide a light diffusion sheet using a polycarbonate resin obtained from biomass resources, where the light diffusion sheet can be hardly damaged even when layered while having better luminance uniformity.

To achieve the above object, the light diffusion sheet of the present disclosure includes "a homopolymerized polycarbonate resin composed of a first structural unit derived from a dihydroxy compound represented by the following formula (1)" or "a copolymerized polycarbonate resin composed of the first structural unit and a second structural unit derived from one or more dihydroxy compounds selected from the group consisting of aliphatic dihydroxy compounds, alicyclic dihydroxy compounds, and ether group-containing dihydroxy compounds (excluding the dihydroxy compound represented by the following formula (1))."

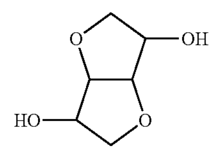

(1)

In the light diffusion sheet of the present disclosure, the homopolymerized polycarbonate resin encompasses not only a "polymer not containing a stereoisomer" but also a "polymer containing a stereoisomer."

The light diffusion sheet of the present disclosure has, at least in its first surface, a plurality of recesses formed in a substantially inverted polygon pyramid or a substantially inverted truncated polygon pyramid. A ridge parting the plurality of recesses has a recessed shape between intersections of the ridge, with respect to a straight line connecting the intersections. A ratio Wr/P is 0.3 or less, where P is an arrangement pitch of the plurality of recesses and Wr is a dimension occupied by a curved portion at a top portion of the ridge in an arrangement direction of the plurality of recesses. A maximum height difference d between the straight line and the ridge is 1 μm or more and 10 μm or less.

The light diffusion sheet of the present disclosure has, at least in its first surface, the plurality of recesses formed in the substantially inverted polygon pyramid or a substantially inverted truncated polygon pyramid. Therefore, the luminance uniformity can be improved. Further, since the ridge parting the recesses (opening edges of the recesses) cause wear and damage, the ridge has a recessed shape between the intersections. This way, wear and damage hardly take place even if the light diffusion sheet is layered with another optical sheet or another light diffusion sheet. Further, the dimension Wr occupied by the curved portion at the top portion of the ridge in the arrangement direction of the recesses is kept at 30% or less of the arrangement pitch of the recesses. This keeps a steep shape of the top portion of the ridge, and therefore, the luminance uniformity hardly drops even when the ridge is recessed between the intersections. Further, the maximum height difference d of 1 μm or more between the straight line connecting the intersections and the ridge can improve the scratch resistance, while the maximum height difference d of 10 μm or less can reduce a drop in the luminance uniformity. Furthermore, by using a polycarbonate resin obtained from biomass resources, it is possible to provide an environmentally friendly product.

Note that, regarding the light diffusion sheet of the present disclosure, considering difficulties in formation of a recess having a geometrically exact inverted polygon pyramid shape or inverted truncated polygon pyramid shape by an ordinary shape transfer technique, the terms "substantially inverted polygon pyramid" or "substantially inverted truncated polygon pyramid" are used. However, it is needless to say that these terms include shapes that can be regarded as a true or approximately inverted polygon pyramid or inverted truncated polygon pyramid.

While the ridge of the light diffusion sheet of the present disclosure has a recessed shape between its intersections in one preferred embodiment, it is not necessary to form the recessed shape in the ridge between all the intersections. In other words, the ridge between some of the intersections may not have the recessed shape.

Further, in the present disclosure, the "light diffusion sheet" encompasses a plate-like "light diffusion plate" and a film-like "light diffusion film."

Further, in the present disclosure, the "optical sheet" means a sheet having various optical functions such as diffusion, light collection, refraction, reflection, and the like, and the "light diffusion sheet" is an "optical sheet."

In the light diffusion sheet of the present disclosure, the maximum height difference d of 1.5 μm or more and 7 μm or less further improves both the scratch resistance as well as the luminance uniformity. In this regard, the maximum height difference d of 2.5 μm or more and 5 μm or less can yet further improve both the scratch resistance and the luminance uniformity.

In the light diffusion sheet of the present disclosure, the ratio Wr/P of 0.2 or less can further improve the luminance uniformity. In this regard, the ratio Wr/P of 0.1 or less can yet further improve the luminance uniformity.

In the light diffusion sheet of the present disclosure, the luminance uniformity can be improved when the arrangement pitch P of the plurality of recesses is 50 μm or more and 500 μm or less, and when the angles formed between the wall surfaces of the plurality of recesses (that is, inclined surfaces of the substantially inverted polygon pyramid or the substantially inverted truncated polygon pyramid) and the sheet surface of the light diffusion sheet are 40 degrees or more and 65 degrees or less.

In the light diffusion sheet of the present disclosure, the ridge recessed in a substantially parabolic shape, a substantially arc shape, a substantially triangular shape, or a substantially trapezoidal shape between the intersections can improve the scratch resistance.

In the light diffusion sheet of the present disclosure, the plurality of recesses are formed in a substantially inverted quadrangular pyramid or a substantially inverted truncated quadrangular pyramid shape. In this case, the ridge may extend in a first direction and a second direction. Further, the maximum height difference d may be an average of a maximum height difference dx between the straight line and the ridge in the first direction and a maximum height difference dy between the straight line and the ridge in the second direction. Further, the arrangement pitch p may be an average of an arrangement pitch Px of the plurality of recesses in the first direction and an arrangement pitch Py of the plurality of recesses in the second direction. Further, the dimension Wr may be an average of a dimension Wrx occupied by the curved portion at the top portion of the ridge in the first direction and a dimension Wry occupied by the curved portion at the top portion of the ridge in the second direction. This allows easier manufacturing of a light diffusion sheet excellent in the scratch resistance and luminance uniformity.

In the light diffusion sheet of the present disclosure, the plurality of recesses are provided only in the first surface, and the second surface is a matte surface. This further improves the luminance uniformity while reducing wear and damage to the second surface.

A backlight unit of the present disclosure is a backlight unit built in a liquid crystal display device and leading light emitted from light sources toward a display screen, the backlight unit including the above-described light diffusion sheet of the present disclosure between the display screen and the light sources.

Since the backlight unit of the present disclosure includes the above-described light diffusion sheet of the present disclosure, the luminance uniformity can be improved and damages can be reduced even when the light diffusion sheet is layered with another optical sheet.

In the backlight unit of the present disclosure, arranging the light sources on a reflective sheet provided on an opposite side of the display screen as seen from the light diffusion sheet yet further improves the luminance uniformity.

In the backlight unit of the present disclosure, the light diffusion sheet may include a plurality of (e.g., three or more of) light diffusion sheets layered and arranged between the display screen and the light sources. This further improves the luminance uniformity. If, of the three or more light diffusion sheets, the light diffusion sheet closest to the display screen contains a diffusion agent, and the other light diffusion sheets do not substantially contain a diffusion agent, the luminance uniformity is yet further improved.

A liquid crystal display device of the present disclosure includes the above-described backlight unit of the present disclosure and a liquid crystal display panel.

Since the liquid crystal display device of the present disclosure includes the above-described backlight unit of the present disclosure, the luminance uniformity can be improved and damages can be reduced even when the light diffusion sheet is layered with another optical sheet.

An information apparatus of the present disclosure includes the above described liquid crystal display device of the present disclosure.

Since the information apparatus of the present disclosure includes the above-described liquid crystal display device of the present disclosure, the luminance uniformity can be improved and damages can be reduced even when the light diffusion sheet is layered with another optical sheet.

A method of manufacturing the light diffusion sheet of the present disclosure is a method for manufacturing the above-described light diffusion sheet of the present disclosure, the method including extrusion molding of the light diffusion sheet at the line speed of 10 m/min or more and 30 m/min or less, with the compression line pressure of 100 kgf/cm or more and 500 kgf/cm or less.

The method of manufacturing a light diffusion sheet of the present disclosure allows the dimension Wr occupied by the curved portion at the top portion of the ridge in the arrangement direction of the recesses to be 30% or less of the arrangement pitch of the recesses. This enables manufacturing of the light diffusion sheet with a steep top portion of the ridge and excellent luminance uniformity.

Further, the method of manufacturing a light diffusion sheet of the present disclosure can make the maximum height difference d between the straight line connecting the intersections and the ridge to be 1 μm or more and 10 μm or less. That is, a light diffusion sheet with the ridge recessed between its intersections and the portions of the intersections raised can be obtained. Therefore, even when the light diffusion sheet is layered with another optical sheet, the ridge hardly contacts the other optical sheet and the like between the intersections, which makes wear and damage less likely. Further, since the intersections point-contact the other optical sheet and the like, sliding is caused such that wear and damage are less likely. Thus, a light diffusion sheet excellent in scratch resistance can be manufactured.

Further, the method of manufacturing a light diffusion sheet of the present disclosure employs extrusion molding, which allows manufacturing of the light diffusion sheet of the present disclosure at low costs.

Further, according to the method of manufacturing the light diffusion sheet of the present disclosure, since a polycarbonate resin obtained from biomass resources is used, it is possible to provide an environmentally friendly product.

According to the present disclosure, it is possible to provide a light diffusion sheet using a polycarbonate resin obtained from biomass resources, where the light diffusion sheet can be hardly damaged even when layered while having better luminance uniformity.

DETAILED DESCRIPTION

Embodiment

Embodiments of the present disclosure will be described below with reference to the drawings. Note that the scope of the present disclosure is not limited to the following embodiments, and may be altered in any way within the scope of the technical concept of the present disclosure.

<Liquid Crystal Display Device>

Figure 1:
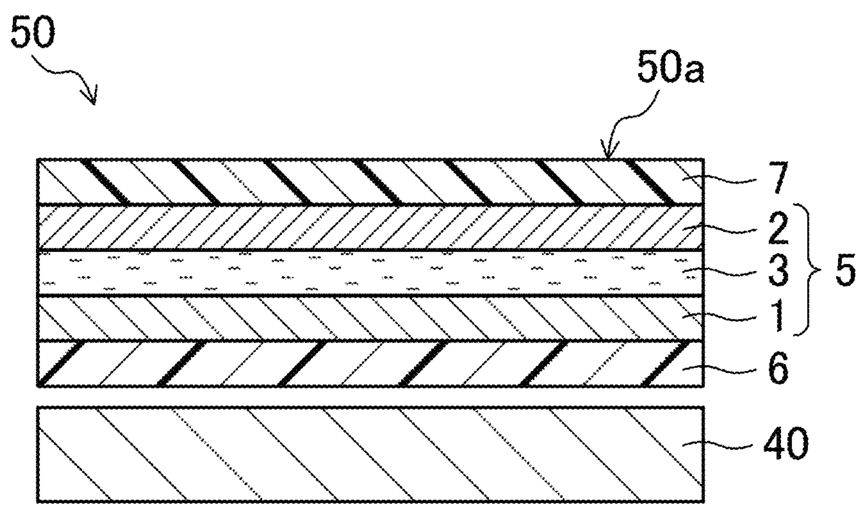
FIG. 1 is a cross-sectional view of a liquid crystal display device of an embodiment.

As shown in FIG. 1, a liquid crystal display device 50 of the present embodiment includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 provided on a back surface side of the liquid crystal display panel 5 with the first polarizing plate 6 interposed. The liquid crystal display panel 5 includes a TFT substrate 1 and a CF substrate 2 provided so as to face each other, a liquid crystal layer 3 provided between the TFT substrate 1 and the CF substrate 2, and a sealing (not shown) provided in a frame shape to seal the liquid crystal layer 3 between the TFT substrate 1 and the CF substrate 2.

The shape of a display screen 50*a* of the liquid crystal display device 50 viewed from the front (the top in FIG. 1) is basically a rectangle or a square: however, the shape may be any shape, such as a rectangle with rounded corners, an oval, a circle, a trapezoid, or the shape of an instrument panel of an automobile.

The liquid crystal display device 50 displays an image by applying a voltage of a predetermined magnitude to the liquid crystal layer 3 in the sub-pixels corresponding to pixel electrodes, to change the alignment state of the liquid crystal layer 3 to adjust the transmission of light entering from the backlight unit 40 through the first polarizing plate 6 such that this light is emitted through the second polarizing plate 7.

The liquid crystal display device 50 of the present embodiment is used as a display device incorporated in various information apparatuses (e.g., an in-vehicle device such as a car navigation system, a personal computer, a mobile phone, a portable information terminal, a portable game machine, a copying machine, a ticket vending machine, an automated teller machine, and the like).

The TFT substrate 1 includes, for example, a plurality of TFTs arranged in a matrix on a glass substrate, an interlayer insulating film arranged in such a manner as to cover the TFTs, a plurality of pixel electrodes arranged in a matrix on the interlayer insulating film and connected to the TFTs, respectively, and an alignment film arranged in such a manner as to cover the pixel electrodes. The CF substrate 2 includes, for example, a black matrix arranged in a lattice manner on a glass substrate, a color filter including a red layer, a green layer, and a blue layer arranged in each lattice of the black matrix, a common electrode arranged in such a manner as to cover the black matrix and the color filter, and an alignment film arranged in such a manner as to cover the common electrode. The liquid crystal layer 3 is made of, for example, a nematic liquid crystal material containing liquid crystal molecules having electro-optical characteristics. The first polarizing plate 6 and the second polarizing plate 7 each includes, for example, a polarizer layer having a polarization axis in one direction, and a pair of protective layers arranged in such a manner as to sandwich the polarizer layer.

<Backlight Unit>

Figure 2:
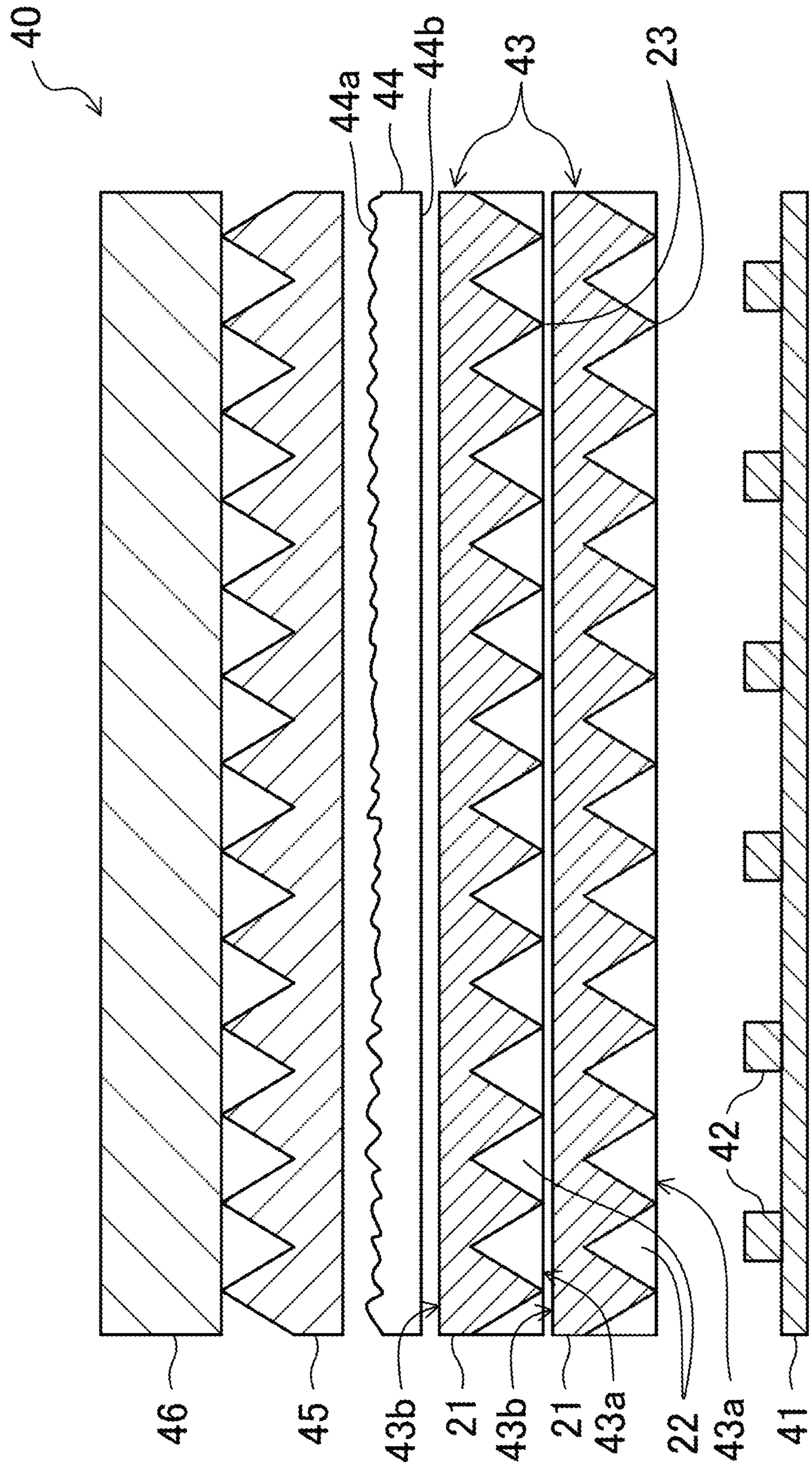
FIG. 2 is a cross-sectional view of a backlight unit of the embodiment.

As shown in FIG. 2, the backlight unit 40 of the present embodiment includes a reflective sheet 41, a plurality of small light sources 42 two-dimensionally arranged on the reflective sheet 41, a multilayer of first light diffusion sheets 43 arranged above the plurality of small light sources 42, a second light diffusion sheet 44 arranged above the multilayer of the first light diffusion sheets 43, and a first prism sheet 45 and a second prism sheet 46 sequentially arranged above the second light diffusion sheet 44. In this example, the multilayer of the first light diffusion sheets 43 are formed by stacking two first light diffusion sheets 43 having the same structure. Although not shown, a polarizing sheet may be provided on the upper side of the second prism sheet 46.

The reflective sheet 41 is formed of, for example, a white polyethylene terephthalate resin film, a silver-deposited film, or the like.

Figure 3:
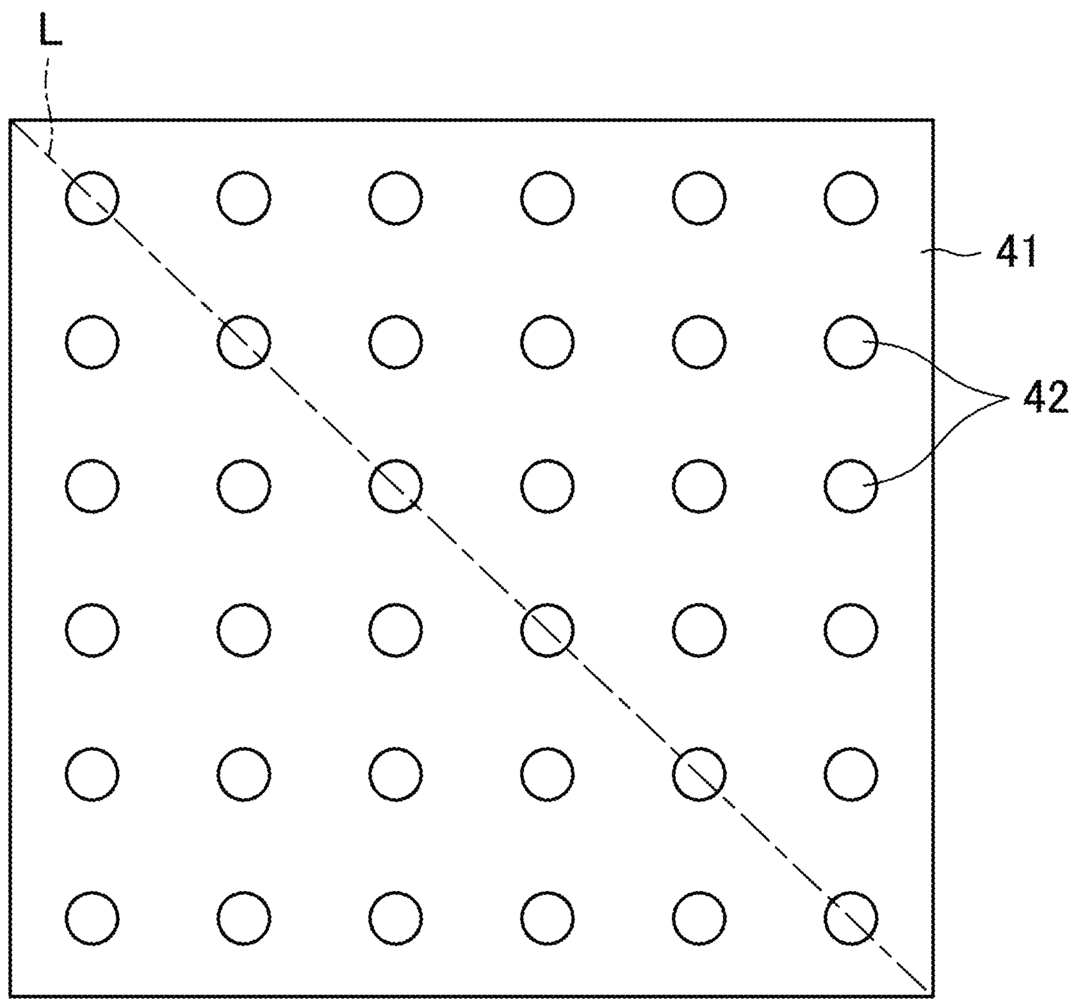
FIG. 3 is a plan view showing an exemplary arrangement of light sources in the backlight unit shown in FIG. 2.

The type of the small light sources 42 is not limited. For example, an LED element, a laser element, or the like may be adopted, and an LED element may be adopted for the sake of costs, productivity, and the like. Further, to adjust a light emission angle of each LED element to serve as the small light source 42, a lens may be attached to the LED element. For example, as shown in FIG. 3, a plurality of small light sources 42 including LED elements each having a size of several mm squares may be arranged on the reflective sheet 41 in a two dimensional array at regular intervals. Each of the small light sources 42 may have a rectangular shape in a plan view, where each side may be 10 μm or more (preferably 50 μm or more) and 20 mm or less (preferably 10 mm or less, more preferably 5 mm or less).

Further, the number of the small light sources 42 is not limited. However, to be distributed, the plurality of small light sources 42 may be arranged regularly on the reflective sheet 41 in one preferred embodiment. The "arranged regularly" means arrangement with a certain regularity. Examples include the case where the small light sources 42 are arranged at equal intervals. If the small light sources 42 are arranged at equal intervals, the distance between the centers of two adjacent small light sources 42 may be 0.5 mm or more (2 mm or more in one preferred embodiment) and 20 mm or less.

Figure 4:
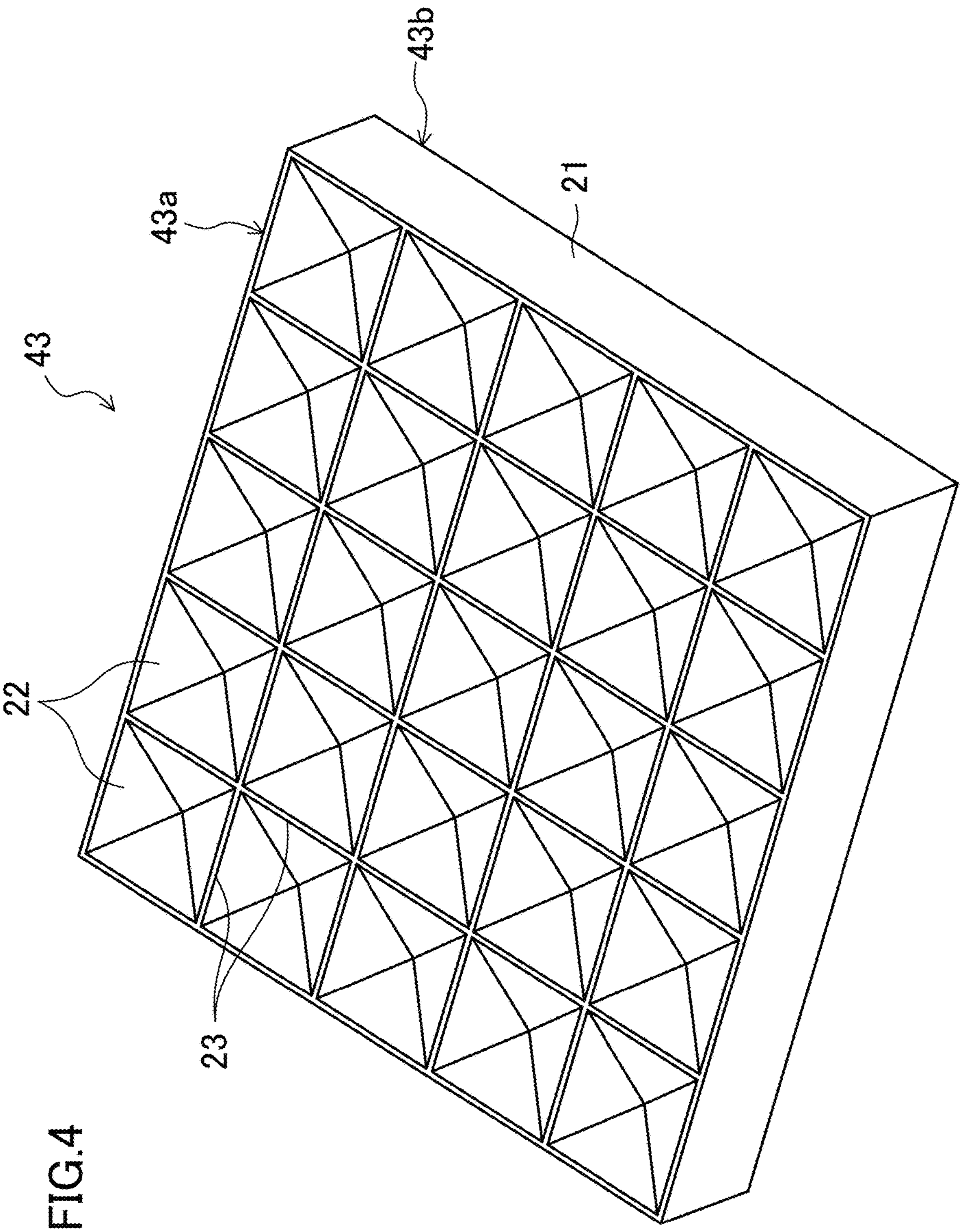
FIG. 4 is a perspective view of a light diffusion sheet of the embodiment.

Each first light diffusion sheet 43 includes a base material layer 21. A plurality of recesses 22 are provided on a first surface (a surface facing the small light sources 42) 43*a* of the first light diffusion sheet 43. The plurality of recesses 22 are formed in a substantially inverted polygon pyramid shape or a substantially inverted truncated polygon pyramid shape. In the present example, the plurality of recesses 22 are formed in a substantially inverted square pyramid shape. The recesses 22 adjacent to each other are parted by a ridge 23. The arrangement pitch of the array of recesses 22 is, for example, about 50 μm or more and about 500 μm or less. The angle formed by a wall surface of the recess 22 (an inclined surface of the substantially inverted polygon pyramid or the substantially inverted truncated polygon pyramid) and the sheet surface of the first light diffusion sheet 43 (an imaginary mirror surface without the recess 22) is, for example, 40 degrees or more and 65 degrees or less. In other words, the top angle of the recess 22 is, for example, 50 degrees or more and 100 degrees or less. A second surface 43*b* of the first light diffusion sheet 43 may be a mirror surface, but is a matte surface in order to improve the diffusivity in one preferred embodiment. FIG. 4 shows a state in which the recesses 22 each formed in a substantially inverted square pyramid shape are arranged in a 5×5 matrix on the first surface 43*a* of the first light diffusion sheet 43.

The base material layer 21 is made of polycarbonate obtained from biomass resources as a base material (matrix resin), and contains no diffusion agent in one preferred embodiment; however, for example, about 0.1 to 4% by mass of a diffusion agent may be contained for 100% by mass of the base material. The matrix resin of the first light diffusion sheet 43 will be described in detail later. The diffusion agent may be a suitable known material. While this example deals with a case where the first light diffusion sheet 43 has a single-layer structure of the base material layer 21, the first light diffusion sheet 43 may, instead, have a structure of two or more layers including a layer with the recesses 22 formed.

The second light diffusion sheet 44 may have a matte surface on its first surface (the surface facing the first prism sheet 45) 44*a* and a mirror surface on or a recess formed in a substantially inverted square pyramid on its second surface 44*b*. The second light diffusion sheet 44 is made of, for example, polycarbonate as a base material (matrix resin), and contains a diffusion agent in one preferred embodiment. For example, about 0.5 to 4% by mass of a diffusion agent may be contained for 100% by mass of the base material. The second light diffusion sheet 44 is made by, for example, mixing 1 part by mass of silicone composite powder (average particle diameter of 2.0 μm) as a diffusion agent for 99 parts by mass of aromatic polycarbonate resin.

The first prism sheet 45 and the second prism sheet 46 are each, for example, a film having thereon a plurality of grooves each having an isosceles triangular transversal cross-section. The top angle of a prism between a pair of grooves adjacent to each other is approximately 90 degrees. The grooves formed on the first prism sheet 45 and the grooves formed on the second prism sheet 46 are arranged so that each groove on the first prism sheet 45 and each groove on the second prism sheet 46 are perpendicular to each other. The first prism sheet 45 and the second prism sheet 46 may be formed as one piece. The first prism sheet 45 and the second prism sheet 46 may be, for example, made of polyethylene terephthalate (PET) film with a prism shape formed by using UV-curable acrylic resin.

Although not shown, in a case of providing a polarizing sheet on the upper side of the second prism sheet 46, the polarizing sheet may be, for example, DBEF series manufactured by 3M. The polarizing sheet improves the luminance of the display screen 50*a* by keeping light emitted from the backlight unit 40 from being absorbed into the first polarizing plate 6 of the liquid crystal display device 50.

<Detailed Configuration of Light Diffusion Sheet>

In the example shown in FIG. 2, a plurality of recesses 22 are formed in the first surface (the surface facing the small light sources 42) 43*a* of the first light diffusion sheet 43; however, instead, or in addition to this, a plurality of other recesses similar to the recesses 22 may be formed in the second surface 43*b* of the first light diffusion sheet 43.

The plurality of recesses 22 are formed in a substantially inverted polygon pyramid shape or a substantially inverted truncated polygon pyramid shape. The plurality of recesses 22 may be regularly two-dimensionally arranged. The "inverted (truncated) polygon pyramids" are (truncated) triangular pyramids, (truncated) quadrangular pyramids, or (truncated) hexagonal pyramids, which can be two-dimensionally arranged without a space therebetween in the surface in one preferred embodiment. The surfaces of the recesses 22 are formed by a manufacturing process such as extrusion molding or injection molding using a die (e.g., metal rolls). In view of the accuracy in cutting the surface of the die (or each metal roll), the "inverted (truncated) polygon pyramids" may be inverted (truncated) quadrangular pyramids.

Note that, considering difficulty in formation of a recess having a geometrically exact inverted polygon pyramid shape or inverted truncated polygon pyramid shape by an ordinary shape transfer technique, the terms "substantially inverted polygon pyramid" or "substantially inverted truncated polygon pyramid" are used. However, it is needless to say that these terms include shapes that can be regarded as a true or approximately inverted polygon pyramid or inverted truncated polygon pyramid. Here, "substantial(ly)" XX means that shapes can be approximated to the XX. For example, "substantially quadrangular pyramids" means shapes can be approximated to the quadrangular pyramids. Further, inevitable variations in the shape of the "inverted polygon pyramid" or the "inverted truncated polygon pyramid" attributed to processing accuracy of industrial production are also encompassed by the "substantially inverted polygon pyramid" or the "substantially inverted truncated polygon pyramid."

If a plurality of recesses 22 are regularly two-dimensionally arranged, the plurality of recesses 22 may be arranged without a space therebetween on the entire surface of the first light diffusion sheet 43. Alternatively, the recesses 22 may be arranged at regular intervals (i.e., a constant pitch).

The first light diffusion sheet 43 may be a base material layer 21 containing not diffusion agent and may be, for example, a base material layer 21 made of a clear polycarbonate. When the base material layer 21 contains a diffusion agent, the diffusion agent is not limited; however, examples of the diffusion agent may include silica, titanium oxide, aluminum hydroxide, and barium sulfate as inorganic particles, as well as acrylic, acrylonitrile, silicone, polystyrene, and polyamide as organic particles. The particle size of the diffusion agent may be, for example, 0.1 μm or more (preferably 1 μm or more) and 10 μm or less (preferably 8 μm or less) in view of the light diffusing effect. Although the first light diffusion sheet 43 contains no diffusion agent in one preferred embodiment, the concentration of the diffusion agent may be, for example, 0.1% or more (preferably 0.3% or more) by mass and 10% or less (preferably 8% or less) by mass for 100% by mass of the material (i.e., the matrix) of the base material layer 21, in view of reflection and refraction effects by the substantially inverted polygon pyramid shape and the light diffusing effect by the diffusion agent. The difference in refractive index between the diffusion agent and the matrix of the base material layer 21 may be 0.01 or more, preferably 0.03 or more, more preferably 0.05 or more, further more preferably 0.1 or more, and most preferably 0.15 or more. A difference of less than 0.01 between the refractive index of the diffusion agent and that of the matrix of the base material layer 21 causes insufficient diffusion effects of the light diffusion agent.

The thickness of the first light diffusion sheet 43 is not limited, but may be, for example, 0.1 mm or more and 3 mm or less (preferably 2 mm or less, more preferably 1.5 mm or less, and further more preferably 1 mm or less). The first light diffusion sheet 43 with a thickness larger than 3 mm makes it difficult to achieve a reduction in the thickness of the liquid crystal display. On the other hand, the first light diffusion sheet 43 with a thickness smaller than 0.1 mm makes it difficult to achieve the effect of improving the luminance uniformity.

If the first light diffusion sheet 43 has a multilayer structure (e.g., the base material layer as the first layer and a recess-formed layer as the second layer), the recess-formed layer has a thickness that is greater than a maximum depth of the recesses 22. For example, the thickness of the layer having the recesses with the depth of 20 μm is larger than 20 μm. The first light diffusion sheet 43 may include three-layers or more including the base material layer and the recess-formed layer. Alternatively, the base material layer and the recess-formed layer each serving as an independent sheet may be layered or separately arranged.

<Matrix Resin of Light Diffusion Sheet>

The matrix resin of the first light diffusion sheet 43 may be, for example, a homopolymerized polycarbonate resin composed of a first structural unit derived from a dihydroxy compound represented by the following formula (1).

(1)

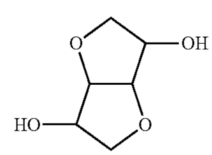

Examples of the dihydroxy compound represented by the above formula (1) include isosorbide, isomannide, and isoidide which have a stereoisomeric relationship with one another and are represented by the following formulae (2), (3), and (4), respectively. One of those compounds may be used alone, or two or more of them may be used in combination. That is, the homopolymerized polycarbonate resin encompasses not only a "polymer not containing a stereoisomer" but also a "polymer containing a stereoisomer."

(2)

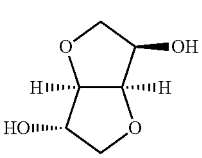

(3)

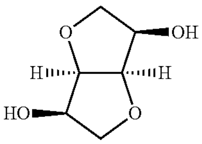

-continued (4)

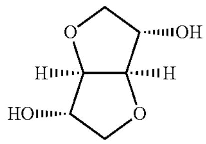

Isosorbide is an abundant plant-derived resource and can be easily obtained by dehydration-condensation of sorbitol produced from a variety of readily available starches. Therefore, isosorbide can be easily obtained and produced. Further, polycarbonate resin obtained by a method using isosorbide as a main raw material is also suitable as a matrix resin material for the first light diffusion sheet 43 because of its excellence in moldability, heat resistance, impact resistance, surface hardness, and carbon neutrality.

The matrix resin of the first light diffusion sheet 43 may be a copolymerized polycarbonate resin including a first structural unit derived from the dihydroxy compound represented by the formula (1) and a second structural unit derived from one or more dihydroxy compounds (hereinafter referred to as "another (the other) dihydroxy compounds" in some cases) selected from the group consisting of aliphatic dihydroxy compounds, alicyclic dihydroxy compounds, and ether group-containing dihydroxy compounds (excluding the dihydroxy compound represented by the formula (1)). The copolymerized polycarbonate resin including the second structural unit is excellent in terms of impact resistance.

The aliphatic dihydroxy compound may be a linear aliphatic dihydroxy compound or may be a branched aliphatic dihydroxy compound, and may be, for example, ethylene glycol; 1,3-propanediol; 1,2-propanediol; 1,4-butanediol; 1,3-butanediol; 1,2-butanediol; 1,5-heptanediol; 1,6-hexanediol; 1,10-decanediol; or the like.

The alicyclic dihydroxy compound may be, for example, 1,2-cyclohexanedimethanol; 1,3-cyclohexanedimethanol; 1,4-cyclohexanedimethanol; tricyclodecanedimethanol; pentacyclopentadecanedimethanol; 2,6-decalindimethanol; 1,5-decalindimethanol; 2,3-decalindimethanol; 2,3-norbornanedimethanol; 2,5-norbornanedimethanol; 1,3-adamantanedimethanol; or the like.

The ether group-containing dihydroxy compound may be, for example, diethylene glycol; triethylene glycol; polyethylene glycol (molecular weight: 150 to 2000); poly-1,3-propylene glycol; polytetramethylene glycol; or the like.

From the viewpoint of heat resistance of the copolymerized polycarbonate resin, the "other dihydroxy compound" is preferably an alicyclic dihydroxy compound, and among alicyclic dihydroxy compounds, cyclohexanedimethanol is preferred from the viewpoint of both heat resistance and impact resistance.

The content of the second structural unit derived from the "other dihydroxy compound" in the copolymerized polycarbonate resin is preferably 5 mol % or more, further preferably 20 mol % or more, and particularly preferably 30 mol % or more, while it is preferably 50 mol % or less, further preferably 45 mol % or less, in the structural units derived from all dihydroxy compounds in the polycarbonate resin. If the second structural unit derived from the "other dihydroxy compounds" in the copolymerized polycarbonate resin is too little, the impact resistance may be insufficient, and if too much, the heat resistance may be insufficient.

The polycarbonate resin that serves as a matrix resin for the first light diffusion sheet 43 can be manufactured by a commonly practiced polycarbonate resin manufacturing method. The manufacturing method may be, for example, any of a solution polymerization method using phosgene or a melt polymerization method involving reaction of a carbonic acid diester with a dihydroxy compound, but the melt polymerization method involving reaction of a dihydroxy compound represented by the above formula (1) with a carbonic acid diester having lower toxicity to the environment in the presence of a polymerization catalyst is preferred.

The polycarbonate resin serving as a matrix resin of the first light diffusion sheet 43 can also be manufactured by transesterification of the dihydroxy compound represented by the formula (1) with a carbonic acid diester such as diphenyl carbonate. More specifically, the polycarbonate resin can be obtained by conducting transesterification and removing monohydroxy compounds and the like produced as byproducts from the system. In this case, the melt polymerization is usually carried out by transesterification in the presence of a transesterification catalyst.

<Method of Manufacturing Light Diffusion Sheet>

A method of manufacturing the first light diffusion sheet 43 will be described below. The method of manufacturing the first light diffusion sheet 43 is not limited. For example, extrusion molding or injection molding may be employed. When the first light diffusion sheet 43 is extrusion-molded, a line speed may be set to, for example, 10 m/min or more and 30 m/min or less, and the compression line pressure may be set to, for example, 100 kgf/cm or more and 500 kgf/cm or less.

The procedure for producing a single-layer light diffusion sheet having unevenness on its surface by extrusion molding is as follows. First, plastic particles as pellets added with a diffusion agent are introduced into a single-screw extruder. The plastic particles may be mixed with other plastic particles as pellets added with no diffusion agent. Then, the plastic particles are heated, molten, and kneaded. To manufacture a light diffusion sheet containing no diffusion agent, only plastic particles having no diffusion agent added thereto are used as pellets. After that, the molten resin extruded from a T-die is sandwiched and cooled between two metal rolls and transported by using guide rolls, and then cut off into sheet plates by a sheet cutter machine to produce diffusion sheets. Here, the molten resin is sandwiched using the metal roll having a surface with an inverted shape of desired unevenness, which will be transferred onto the resin. This allows for shaping of diffusion sheets to have surfaces with the desired unevenness. However, the surface shapes of the rolls are not 100% transferred onto the resin and may thus be counted backwards from the degree of transfer to be designed.

If a two-layered light diffusion sheet with an uneven surface may be manufactured by extrusion molding, for example, plastic particles as pellets necessary for forming each layer are introduced into each of two single-screw extruders, the procedure above is then performed for each layer. Then, the fabricated sheets are layered.

Alternatively, the two-layered light diffusion sheet with an uneven surface may be manufactured as follows. First, plastic particles as pellets necessary for forming each layer are introduced into each of two single-screw extruders, molten by heating, and kneaded. Then, molten resin to become each layer is introduced into a single T-die, where layers of multiple molten resins are stacked, and the layers of the molten resins extruded through the T-die are then sandwiched and cooled between two metal rolls. After that, the layers of molten resin are transported by guide rolls and cut off into sheet plates using a sheet cutter machine, thereby yielding a double-layer diffusion sheet with an uneven surface.

Alternatively, the light diffusion sheet may be produced by shape-transfer using ultraviolet (UV) as follows. First, an uncured UV-curing resin is filled in a roll having an inverted shape of an uneven surface to be transferred, and a base material is pressed against the resin. Next, with the roll filled with UV-curing resin and the base material in one piece, the resin is cured by UV irradiation. Next, the sheet to which the shape of the uneven surface has been transferred by using the resin is released from the roll. Finally, the sheet is again irradiated with ultraviolet rays so that the resin is completely cured, thereby producing a diffusion sheet having an uneven surface.

<Features of Light Diffusion Sheet>

Features of the first light diffusion sheet 43 of the present embodiment will be described below with reference to FIG. 5 to FIG. 10.

Figure 5:
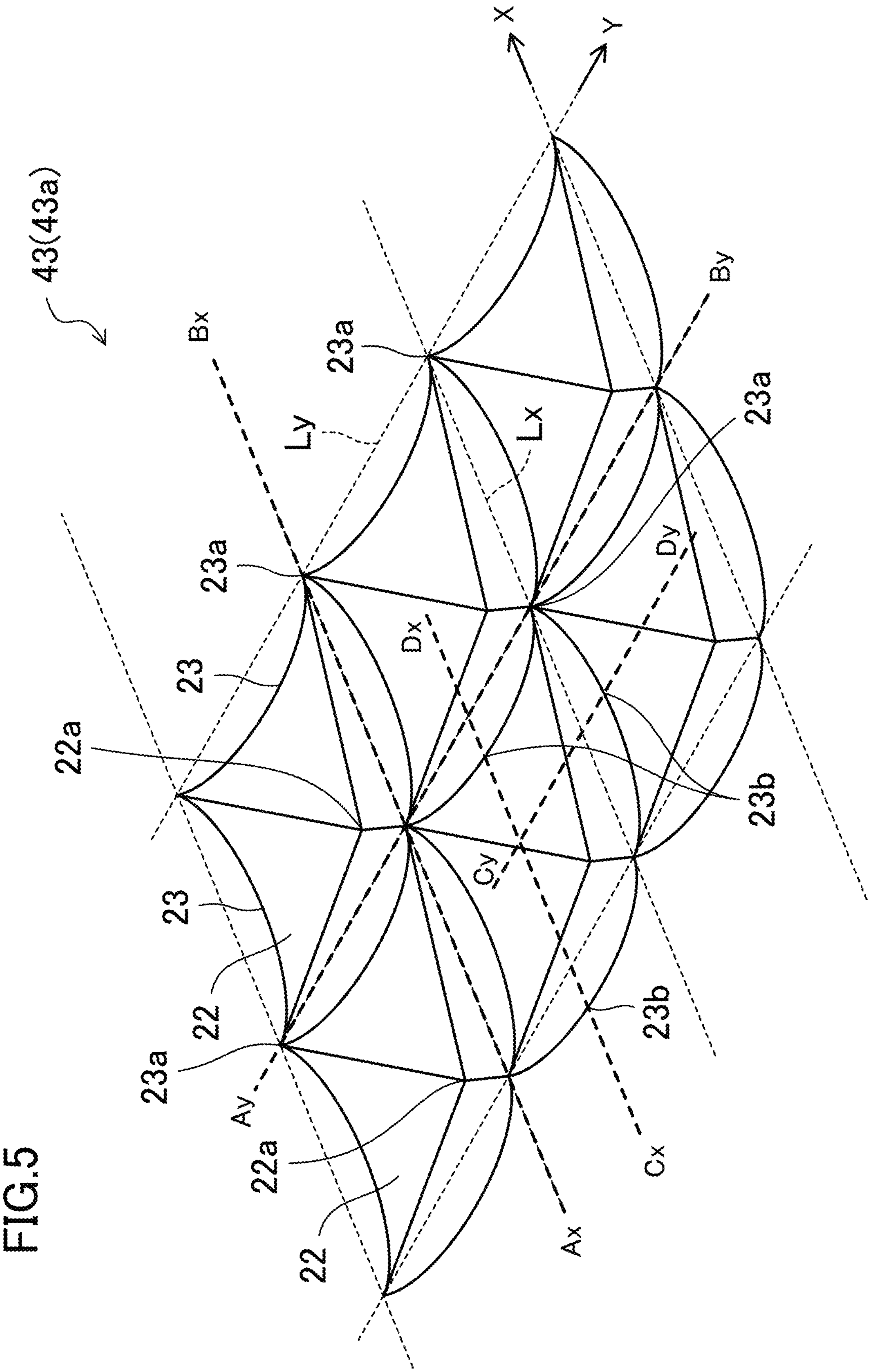
FIG. 5 is an enlarged perspective view showing recesses formed in the light diffusion sheet of the embodiment.

As shown in FIG. 5, the first surface 43*a* of the first light diffusion sheet 43 has the plurality of recesses 22 each formed in, for example, a substantially inverted square pyramid. Each of the plurality of recesses 22 may be formed in a substantially inverted truncated square pyramid. A center 22*a* of each recess 22 is a deepest portion of the recess 22. The plurality of recesses 22 are arranged along the X-direction (first direction) and the Y-direction (second direction) perpendicular to each other. The recesses 22 adjacent to each other are parted by a ridge 23. The ridge 23 extends in the X-direction and the Y-direction.

One of features of the first light diffusion sheet 43 is that the ridge 23 has a recessed shape between intersections 23*a* of the ridge 23 with respect to straight lines Lx, Ly connecting the intersections 23*a*. Maximum height differences between the straight lines Lx, Ly connecting the intersections 23*a* and the ridge 23 need to be 1 μm or more and 10 μm or less, and are 1.5 μm or more and 7 μm or less in one preferred embodiment, and are 2.5 μm or more and 5 μm or less in a more preferred embodiment.

While the ridge of the first light diffusion sheet 43 has a recessed shape between its intersections 23*a* in one preferred embodiment, it is not necessary to form the recessed shape in the ridge 23 between all the intersections 23*a*. In other words, the ridge 23 between some of the intersections 23*a* may not have the recessed shape.

Figure 6:
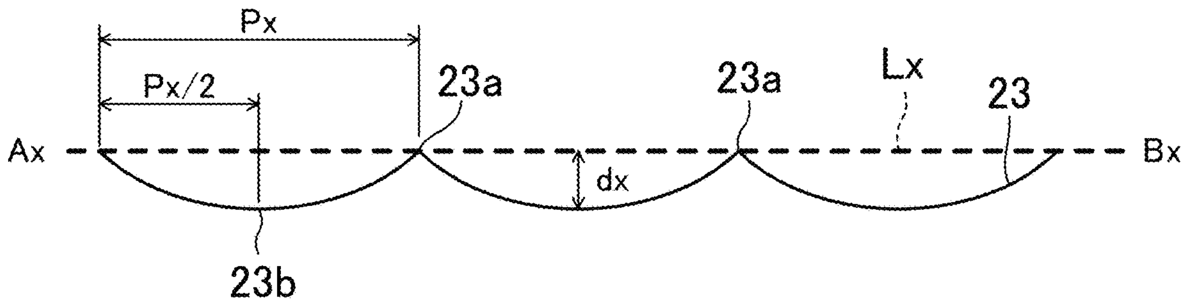
FIG. 6 is a schematic view showing an exemplary shape of an X-directional ridge parting the recesses in the light diffusion sheet according to the embodiment.
Figure 7:
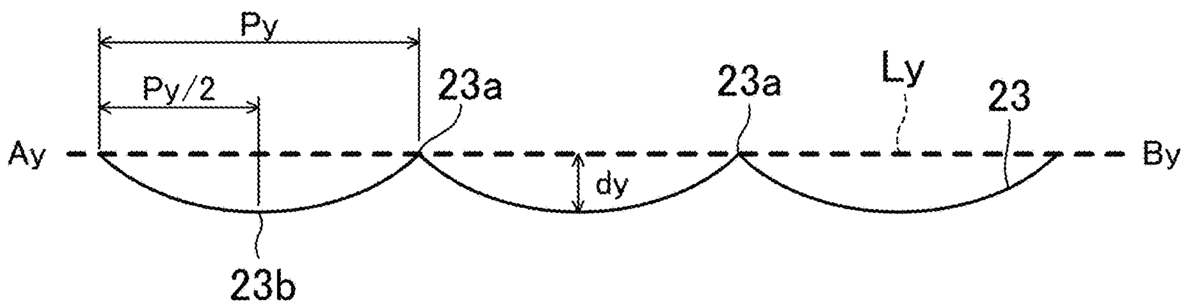
FIG. 7 is a schematic view showing an exemplary shape of a Y-directional ridge parting the recesses in the light diffusion sheet of the embodiment.
Figure 8A:
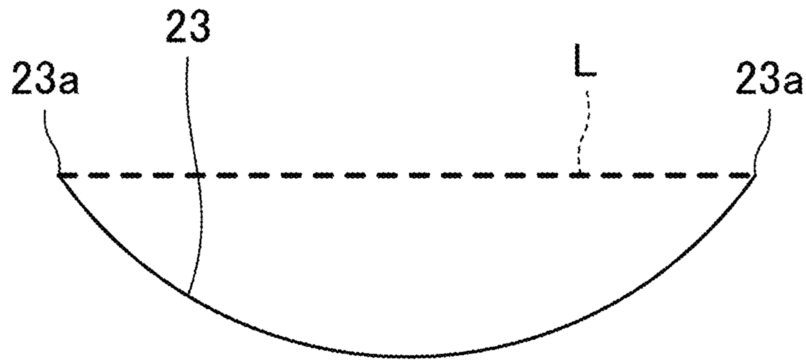
FIGS. 8A-8D are schematic views showing variations in the shape of the ridge parting the recesses in the light diffusion sheet of the embodiment.
Figure 8B:
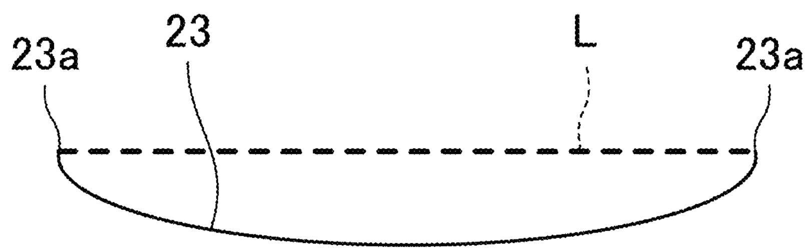
Figure 8C:
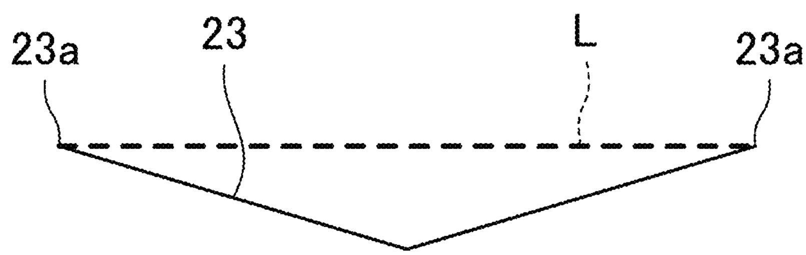
Figure 8D:
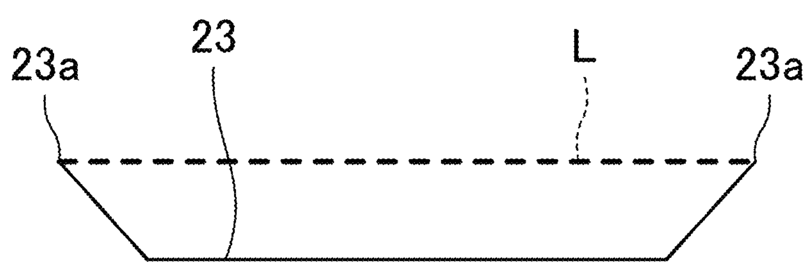

FIG. 6 shows an exemplary shape of a ridge 23 extending in the X-direction along the line Ax-Bx in FIG. 5, as viewed from a direction parallel to the sheet surface and perpendicular to the X-direction. FIG. 7 shows an exemplary shape of a ridge 23 extending in the Y-direction along the line Ay-By in FIG. 5, as viewed from a direction parallel to the sheet surface and perpendicular to the Y-direction. As shown in FIG. 6, the ridge 23 has a recessed shape between the intersections 23*a*, with respect to the straight line Lx connecting the intersections 23*a* of the ridge 23 in the X-direction. Where an arrangement pitch of the recesses 22 in the X-direction is Px, the ridge 23 extending in the X-direction has a lowest point 23*b* in, for example, a Px/2 (a half pitch) position from the intersections 23*a*, and the distance (maximum height difference) from the straight line Lx to the lowest point 23*b* is dx. Further, as shown in FIG. 7, the ridge 23 has a recessed shape between the intersections 23*a*, with respect to the straight line Ly connecting the intersections 23*a* of the ridge 23 in the Y-direction. Where an arrangement pitch of the recesses 22 in the Y-direction is Py, the ridge 23 extending in the Y-direction has a lowest point 23*b* in, for example, a Py/2 (a half pitch) position from the intersections 23*a*, and the distance (maximum height difference) from the straight line Ly to the lowest point 23*b* is dy.

Note that, when the recess 22 is formed in an inverted square pyramid, the arrangement pitch Px of the recesses 22 in the X-direction equals the interval (horizontal distance) between the intersections 23*a* in the X-direction, and the arrangement pitch Py of the recesses 22 in the Y-direction equals the interval (horizontal distance) between the intersections 23*a* in the Y-direction.

Further, where the maximum height difference d is an average of the maximum height difference dx in the X-direction and the maximum height difference dy in the Y-direction, the maximum height difference d needs to be 1 μm or more and 10 μm or less, and may be 1.5 μm or more and 7 μm or less in one preferred embodiment, and may be 2.5 μm or more and 5 μm or less in a more preferred embodiment.

Further, the recessed shape of the ridge 23 between intersections 23*a* is not limited. For example, as shown in FIGS. 8A-8D, the ridge 23 between the intersections 23*a* may be recessed in a substantially arc shape (FIG. 8A), a substantially parabola shape (FIG. 8B), a substantially triangular shape (FIG. 8C), or a substantially trapezoidal shape (FIG. 8D) with respect to the straight line L connecting the intersections 23*a*.

Another feature of the first light diffusion sheet 43 is that, where P is the arrangement pitch of the recesses 22 and Wr is the dimension occupied by a curved portion at the top portion of the ridge 23 in the arrangement direction of the recesses 22, a ratio Wr/P needs to be 0.3 or less, and is 0.2 or less in one preferred embodiment, and is 0.1 or less in a more preferred embodiment.

Figure 9:
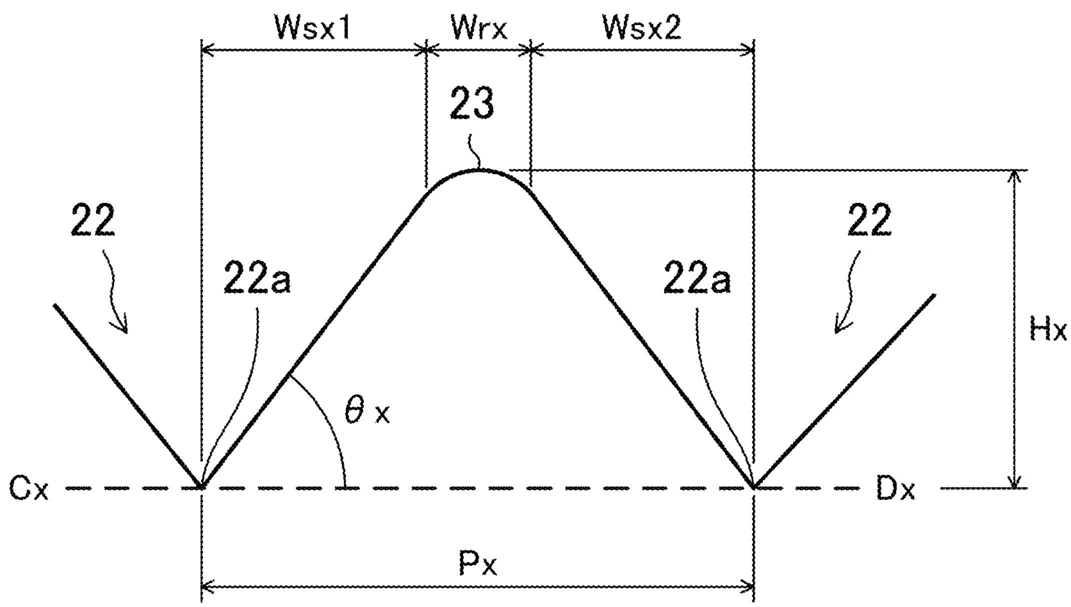
FIG. 9 is a schematic view showing an exemplary cross-sectional configuration of the light diffusion sheet of the embodiment, cut out along a surface perpendicular to the sheet surface and covering the centers of recesses adjacent to each other in the X-direction and an intermediate point of the ridge between the recesses.
Figure 10:
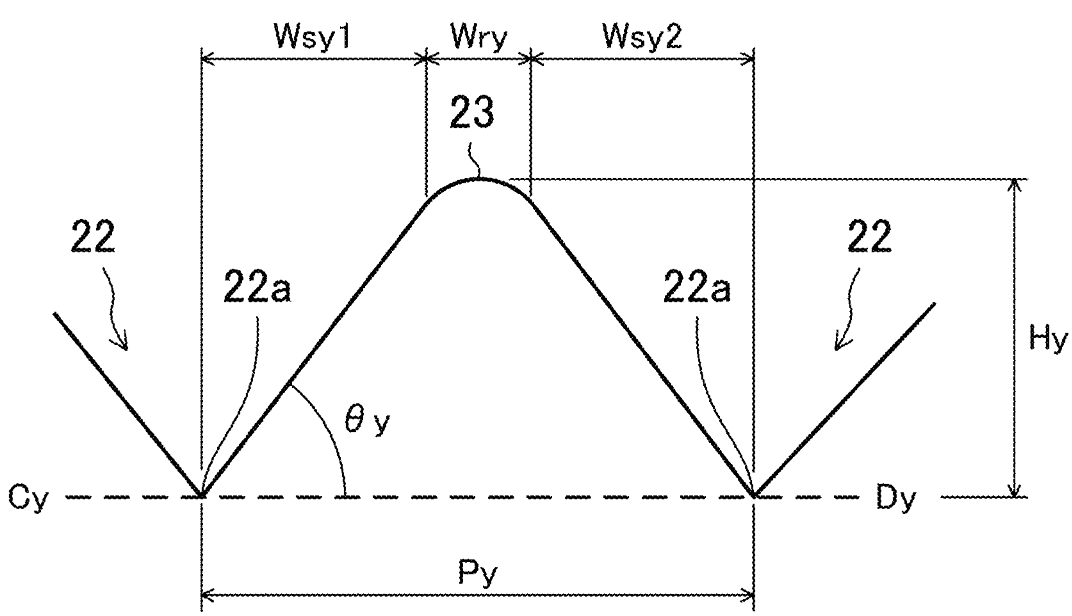
FIG. 10 is a schematic view showing an exemplary cross-sectional configuration of the light diffusion sheet of the embodiment, cut out along a surface perpendicular to the sheet surface and covering the centers of recesses adjacent to each other in the Y-direction and an intermediate point of the ridge between the recesses.

FIG. 9 shows an exemplary cross-sectional configuration of the first light diffusion sheet 43, taken along the line Cx-Dx of FIG. 5. FIG. 10 shows an exemplary cross-sectional configuration of the first light diffusion sheet 43, taken along the line Cy-Dy of FIG. 5. Specifically, FIG. 9 shows an exemplary cross-sectional configuration of the first light diffusion sheet 43, cut out along a surface perpendicular to the sheet surface and covering the centers 22*a* of recesses 22 adjacent to each other in the X-direction and an intermediate point between intersections 23*a* of the ridge 23 between the recesses 22. FIG. 10 shows an exemplary cross-sectional configuration of the first light diffusion sheet 43, cut out along a surface perpendicular to the sheet surface and covering the centers 22*a* of recesses 22 adjacent to each other in the Y-direction and an intermediate point between intersections 23*a* of the ridge 23 between the recesses 22.

In the cross-sectional configuration shown in FIG. 9, the interval (horizontal distance) of the centers 22*a* of the recesses 22 adjacent to each other in the X-direction equals the arrangement pitch Px of the recesses 22 in the X-direction. The dimension occupied by the curved portion at the top portion of the ridge 23 in the X-direction is Wrx. The dimensions occupied by the straight line portions of the wall surfaces (inclined surfaces of the inverted quadrangular pyramid) of the recesses 22 adjacent to each other and sandwiching the ridge 23 in the X-direction are Wsx1 and Wsx2. An angle formed by each wall surface (inclined surface of each inverted quadrangular pyramid) of the recess 22 with the sheet surface in the X-direction is θx. The height from the center 22*a* of the recess 22 to the top point (the intermediate point between the intersections 23*a*) of the ridge 23 (the ridge 23 extending in the Y-direction) is Hx.

In the cross-sectional configuration shown in FIG. 10, the interval (horizontal distance) of the centers 22*a* of the recesses 22 adjacent to each other in the Y-direction equals the arrangement pitch Py of the recesses 22 in the Y-direction. The dimension occupied by the curved portion at the top portion of the ridge 23 in the Y-direction is Wry. The dimensions occupied by the straight line portions of the wall surfaces (inclined surfaces of the inverted quadrangular pyramid) of the recesses 22 adjacent to each other and sandwiching the ridge 23 in the Y-direction are Wsy1 and Wsy2. An angle formed by each wall surface (inclined surface of each inverted quadrangular pyramid) of the recess 22 with the sheet surface in the Y-direction is θy. The height from the center 22*a* of the recess 22 to the top point (the intermediate point between the intersections 23*a*) of the ridge 23 (the ridge 23 extending in the X-direction) is Hy.

Note that, in a case where the recess 22 is formed in an inverted quadrangular pyramid, where P is an average of the arrangement pitch Px and the arrangement pitch Py, and where Wr is an average of the dimension Wrx and the dimension Wry, the ratio Wr/P needs to be set to 0.3 or less, and is set to 0.2 or less in one preferred embodiment, and is set to 0.1 or less in a more preferred embodiment.

Figure 11:
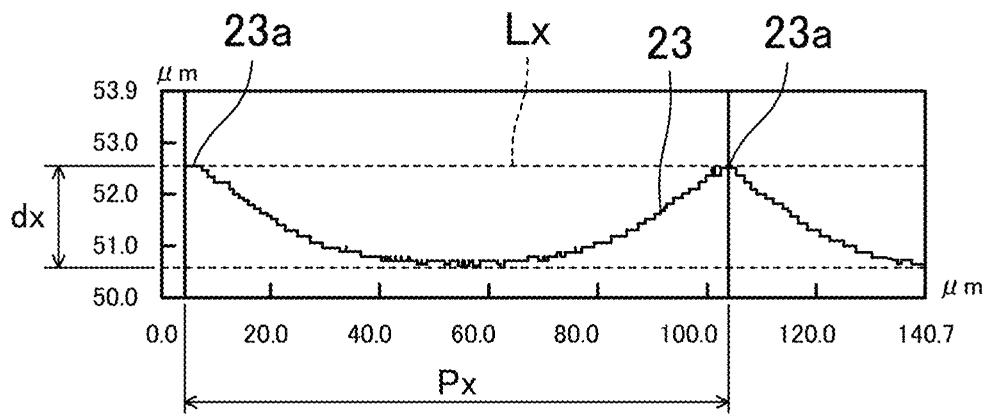
FIG. 11 is a view showing an exemplary result obtained by measuring a shape and a dimension of the X-directional ridge shown in FIG. 6 with a laser microscope.
Figure 12:
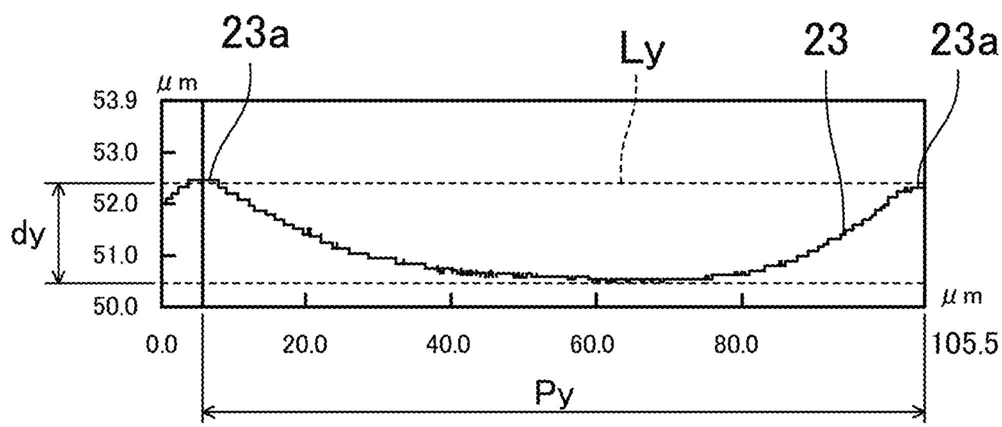
FIG. 12 is a view showing an exemplary result obtained by measuring a shape and a dimension of the Y-directional ridge shown in FIG. 7 with a laser microscope.
Figure 13:
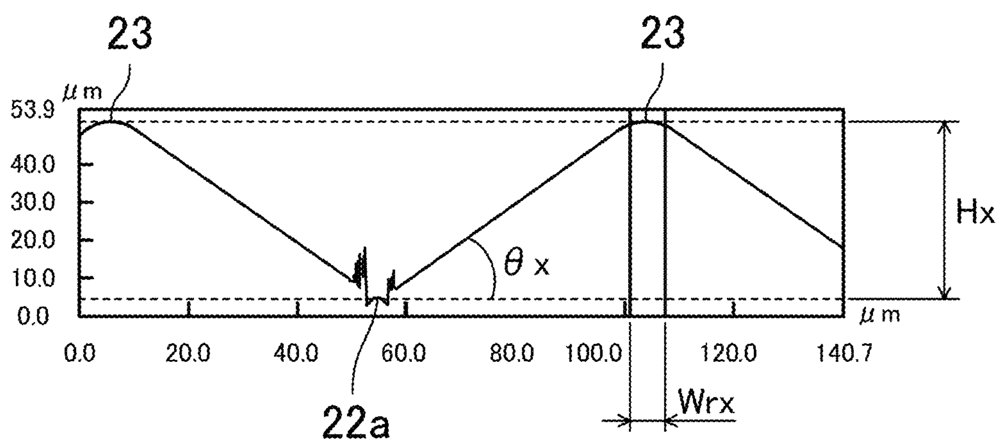
FIG. 13 is a view showing an exemplary result obtained by measuring a shape and a dimension of the cross-sectional configuration shown in FIG. 9 with a laser microscope.
Figure 14:
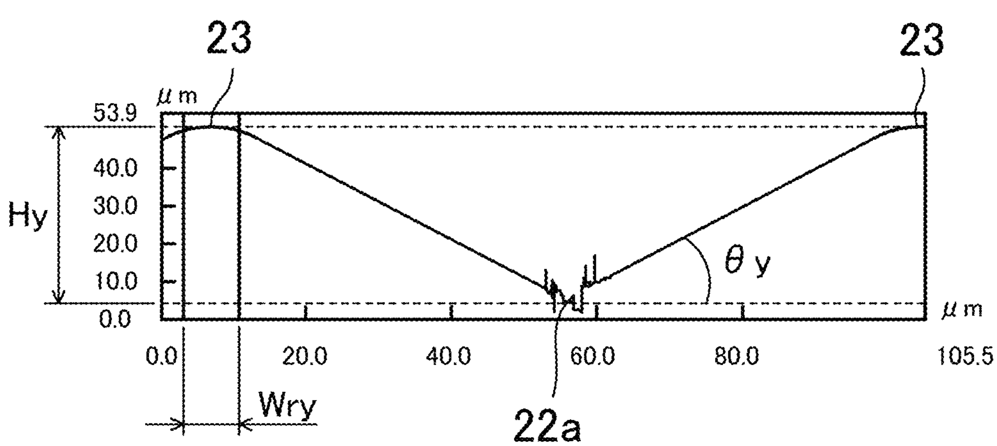
FIG. 14 is a view showing an exemplary result obtained by measuring a shape and a dimension of the cross-sectional configuration shown in FIG. 10 with a laser microscope.

FIG. 11 shows an exemplary result of measurement of the shape and the dimension of the X-directional ridge shown in FIG. 6, by using a laser microscope. FIG. 12 shows an exemplary result of measurement of the shape and the dimension of the Y-directional ridge shown in FIG. 7, by using the laser microscope. FIG. 13 shows an exemplary result of measurement of the shape, the dimension, and the angle of the cross-sectional configuration shown in FIG. 9, by using the laser microscope. FIG. 14 shows an exemplary result of measurement of the shape, the dimension, and the angle of the cross-sectional configuration shown in FIG. 10, by using the laser microscope.

Note that, in FIG. 11 and FIG. 12, in the measurement of the maximum values of the distances (maximum height differences) dx, dy between the ridge 23 and the straight lines Lx, Ly connecting the intersections 23*a* of the ridge 23, maximum values of vertical lines drawn from points on the ridge 23 to the straight lines Lx, Ly were obtained as dx, dy, respectively.

Further, in the measurement of the arrangement pitches Px, Py, the X-directional and Y-directional "horizontal distances between intersections 23*a*" were obtained as Px, Py, respectively. The arrangement pitches Px, Py can be easily and accurately obtained also by this measurement of the "horizontal distances of the intersections 23*a*."

Advantages of Embodiment

As described above, the first light diffusion sheet 43 of the present embodiment includes "a homopolymerized polycarbonate resin composed of a first structural unit derived from a dihydroxy compound represented by the formula (1)" or "a copolymerized polycarbonate resin composed of the first structural unit and a second structural unit derived from one or more other dihydroxy compounds selected from the group consisting of aliphatic dihydroxy compounds, alicyclic dihydroxy compounds, and ether group-containing dihydroxy compounds (excluding the dihydroxy compound represented by the formula (1))."

Further, the first light diffusion sheet 43 of the present embodiment includes, at least in its first surface 43*a*, the plurality of recesses 22 formed in a substantially inverted polygon pyramid or a substantially inverted truncated polygon pyramid. The ridge 23 parting the plurality of recesses 22 has a recessed shape between the intersections 23*a*, with respect to a straight line connecting the intersections 23*a* of the ridge 23. Where P is the arrangement pitch of the plurality of recesses 22 and Wr is the dimension occupied by a curved portion at the top portion of the ridge 23 in the arrangement direction of the plurality of recesses 22, a ratio Wr/P is 0.3 or less. The maximum height difference d between the ridge 23 and the line connecting the intersections 23*a* of the ridge 23 is 1 μm or more and 10 μm or less.

According to the present embodiment, the first light diffusion sheet 43 has, at least in its first surface 43*a*, the plurality of recesses 22 formed in a substantially inverted polygon pyramid or a substantially inverted truncated polygon pyramid. Therefore, the luminance uniformity can be improved. Further, since the ridge 23 parting the recesses 22 (opening edges of the recesses 22) causes wear and damage, the ridge 23 has a recessed shape between the intersections 23*a* of the ridge 23. This way, wear and damage hardly take place even if the first light diffusion sheet 43 is layered with another optical sheet or another light diffusion sheet. Further, the dimension Wr occupied by the curved portion at the top portion of the ridge 23 in the arrangement direction of the recesses 22 is kept at 30% or less of the arrangement pitch P of the recesses. This keeps a steep shape of the top portion of the ridge 23, and therefore, the luminance uniformity hardly drops even when the ridge 23 is recessed between the intersections 23*a* of the ridge 23. Further, the maximum height difference d of 1 μm or more between the straight line connecting the intersections 23*a* and the ridge 23 can improve the scratch resistance, while the maximum height difference d of 10 μm or less can reduce a drop in the luminance uniformity. Further, by using a polycarbonate resin obtained from biomass resources, it is possible to provide an environmentally friendly product.

In the first light diffusion sheet 43 of the present embodiment, the maximum height difference d of 1.5 μm or more and 7 μm or less between the straight line connecting the intersections 23*a* and the ridge 23 can further improve both the scratch resistance as well as the luminance uniformity. In this regard, the maximum height difference d of 2.5 μm or more and 5 μm or less can yet further improve both the scratch resistance and the luminance uniformity.

In the first light diffusion sheet 43 of the present embodiment, the luminance uniformity can be further improved with the ratio Wr/P of 0.2 or less, where P is the arrangement pitch of the plurality of recesses 22 and Wr is the dimension occupied by a curved portion at the top portion of the ridge 23 in the arrangement direction of the plurality of recesses 22. In this regard, the ratio Wr/P of 0.1 or less can yet further improve the luminance uniformity.

In the first light diffusion sheet 43 of the present embodiment, the luminance uniformity can be improved when the arrangement pitch P of the plurality of recesses 22 is 50 μm or more and 500 μm or less, and when the angles formed between the wall surfaces of the plurality of recesses 22 (that is, inclined surfaces of the substantially inverted polygon pyramid or the substantially inverted truncated polygon pyramid) and the sheet surface are 40 degrees or more and 65 degrees or less.

In the first light diffusion sheet 43 of the present embodiment, the ridge 23 recessed in a substantially parabolic shape, a substantially arc shape, a substantially triangular shape, or a substantially trapezoidal shape between the intersections 23*a* can improve the scratch resistance.

In the first light diffusion sheet 43 of the present embodiment, the plurality of recesses 22 are formed in a substantially inverted quadrangular pyramid or a substantially inverted truncated quadrangular pyramid shape. In this case, the ridge 23 may extend in the X-direction (first direction) and the Y-direction (second direction). The maximum height difference d between the straight line connecting the intersections 23*a* and the ridge 23 may be an average value of the maximum height difference dx between the straight line and the ridge 23 in the X-direction and the maximum height difference dy between the straight line and the ridge 23 in the Y-direction. The arrangement pitch P of the plurality of the recesses 22 may be an average value of the arrangement pitch Px of the recesses 22 in the X-direction and the arrangement pitch Py of the recesses 22 in the Y-direction. Further, the dimension Wr occupied by the curved portion at the top portion of the ridge 23 in the arrangement direction of the recesses 22 may be an average of the dimension Wrx occupied by the curved portion at the top portion of the ridge 23 in the X-direction and the dimension Wry occupied by the curved portion at the top portion of the ridge 23 in the Y-direction. This allows easier manufacturing of a light diffusion sheet excellent in the scratch resistance and luminance uniformity.

In the first light diffusion sheet 43 of the present embodiment, the plurality of recesses 22 are provided only in the first surface 43*a*, and the second surface 43*b* is a matte surface. This further improves the luminance uniformity while reducing wear and damage to the second surface 43*b*.

A backlight unit 40 of the present embodiment is a backlight unit 40 built in a liquid crystal display device 50, which leads light emitted from light sources 42 toward a display screen 50*a*, including the above-described first light diffusion sheet 43 of the present embodiment between the display screen 50*a* and the light sources 42.

Since the backlight unit 40 of the present embodiment includes the first light diffusion sheet 43 of the present embodiment, the luminance uniformity can be improved and damages can be reduced even when the first light diffusion sheet 43 is layered with another first light diffusion sheet 43 or with another optical sheet.

In the backlight unit 40 of the present embodiment, arranging the light sources 42 on a reflective sheet 41 provided on an opposite side of the display screen 50*a* as seen from the first light diffusion sheet 43 yet further improves the luminance uniformity.

The liquid crystal display device 50 of the present embodiment includes the backlight unit 40 of the present embodiment and the liquid crystal display panel 5.

Since the liquid crystal display device 50 and an information apparatus including the liquid crystal display device 50 of the present embodiment include the backlight unit 40 of the present embodiment, the luminance uniformity can be improved and damages can be reduced even when the first light diffusion sheet 43 is layered with another first light diffusion sheet 43 or with another optical sheet.

A method of manufacturing the light diffusion sheet of the present embodiment is a method of manufacturing the first light diffusion sheet 43 of the present embodiment, in which the first light diffusion sheet 43 is extrusion-molded at the line speed of 10 m/min or more and 30 m/min or less, with the compression line pressure of 100 kgf/cm or more and 500 kgf/cm or less.

The method of manufacturing a light diffusion sheet of the present embodiment allows the dimension Wr occupied by the curved portion at the top portion of the ridge 23 in the arrangement direction of the recesses 22 to be 30% or less of the arrangement pitch P of the recesses 22. This enables manufacturing of the first light diffusion sheet 43 with a steep top portion of the ridge 23 and excellent luminance uniformity.

Further, the method of manufacturing a light diffusion sheet of the present embodiment allows the maximum height difference d between the straight line connecting the intersections 23*a* and the ridge 23 to be 1 μm or more and 10 μm or less. That is, the first light diffusion sheet 43 with the ridge 23 recessed between intersections 23*a* and the portions of the intersections 23*a* raised can be obtained. Therefore, even when the first light diffusion sheet 43 is layered with another first light diffusion sheet 43 or with another optical sheet, the ridge 23 hardly contacts the other optical sheet and the like between the intersections 23*a*, which makes wear and damage less likely. Further, since the intersections 23*a* point-contact the other optical sheet and the like, sliding is caused such that wear and damage are less likely. Thus, the first light diffusion sheet 43 excellent in scratch resistance can be manufactured.

Further, the method of manufacturing a light diffusion sheet of the present embodiment employs extrusion molding, which allows manufacturing of the first light diffusion sheet 43 of the present embodiment at low costs.

Further, according to the method of manufacturing the light diffusion sheet of the present embodiment, a polycarbonate resin obtained from biomass resources is used. Thus, it is possible to provide an environmentally friendly product.

EXAMPLE

The first light diffusion sheets 43 of Examples will be described below in comparison with Comparative Examples.

<Measurement of Shape, Dimension, and Angle of Recesses>

The shapes of the recesses 22 formed in the first light diffusion sheet 43 of each example described later were observed by using a laser microscope VK-100 manufactured by Keyence Corporation. Specifically, measurements were conducted for: the cross-sectional shape of the ridge 23 of the recess 22 formed in an inverted square pyramid (cross-sectional shapes shown in FIG. 6, FIG. 7, FIG. 9, FIG. 10); the maximum height differences dx, dy shown in FIG. 6 and FIG. 7 (the maximum distance between the straight line connecting the intersections 23*a* and the ridge 23) and their average d: the heights Hx, Hy shown in FIG. 9 and FIG. 10 (the height from the center 22*a* of the recess 22 to the top point of the ridge 23) and their average H: the dimensions Wrx, Wry shown in FIG. 9 and FIG. 10 (the dimensions occupied by the curved portion at the top portion of the ridge 23 in the X-direction and Y-direction) and their average Wr: the arrangement pitches Px, Py of the recesses 22 shown in FIG. 6 and FIG. 7 (horizontal distances between intersections 23*a* in X-direction and Y-direction) and their average P, and the ratio Wr/P (unit: %) of the dimension Wr to the arrangement pitch P; and the angles θx, θy shown in FIG. 9 and FIG. 10 (an angle formed between the sheet surface of the first light diffusion sheet 43 and the wall surfaces of the recesses 22 (inclined surfaces of the inverted square pyramid) in X-direction and Y-direction).

<Measurement of Optical Properties>

Haze and light transmittance at 450 nm wavelengths were measured as optical properties of the first light diffusion sheet 43 of each example described later. Haze was measured in accordance with JIS K-7105 using an HZ-2 manufactured by Suga Test Instruments Co., Ltd. with light entering from the surface with the recesses 22 formed in an inverted square pyramid (first surface 43*a*). Further, the light transmittance at a wavelength of 450 nm was measured by using V-670 manufactured by JASCO Corporation, with light entering from the surface with the recesses 22 formed in an inverted square pyramid (first surface 43*a*).

<Evaluation of Scratch Resistance>

Figure 15:
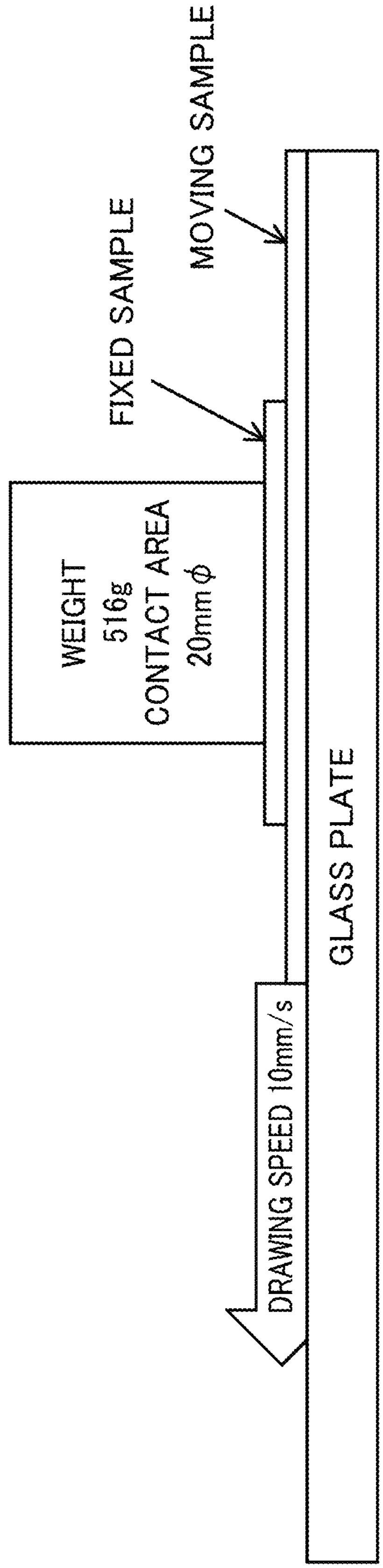
FIG. 15 is a configuration diagram of an apparatus for measuring scratch resistance of light diffusion sheets of Examples.

For the scratch resistance test of the first light diffusion sheet 43 in each example described below, an apparatus shown in FIG. 15 was used. As shown in FIG. 15, a moving sample and a fixed sample are layered in this order on a glass plate, and a weight of 516 g is placed from above on a circular area of 20 mm in diameter. Then, the moving sample was drawn at a drawing speed of 10 mm/second and moved by 100 mm, and the levels of scratches on the friction surfaces between the moving sample and the fixed sample were visually inspected and determined. The fixed sample was a first light diffusion sheet 43 and its lower surface was the first surface 43*a* (the surface having recesses 22 formed in an inverted square pyramid shape). The moving sample was another first light diffusion sheet 43 and its upper surface was the second surface 43*b* (matte surface). The inspection and determination were performed on both the lower surface of the fixed sample (the surface with recesses 22 in the inverted square pyramid shape) and the upper surface of the moving sample (the matte surface).

Evaluation in inspection and determination is based on the following criteria.

- AA: No scratch is visually observed, and the light diffusion sheet has very excellent scratch resistance.
- A: Almost no scratch is visually observed, and the light diffusion sheet has remarkably excellent scratch resistance.
- B: Scratches are slightly visible, and the light diffusion sheet has scratch resistance that was excellent to some extent.
- C: Some scratches are visible, and the light diffusion sheet has scratch resistance that is close to a lower limit somehow acceptable.
- X: Many scratches are clearly visible, and the light diffusion sheet has inferior scratch resistance.

<Measurement of Luminance and Luminance Uniformity>

The configuration of the backlight unit 40 shown in FIG. 2 and FIG. 3 were adopted for measuring the luminance and the luminance uniformity of the first light diffusion sheet 43 of each example described later. That is, on the small light sources 42 (LED array) arranged in an array, two first light diffusion sheets 43 each having the recesses 22 in an inverted square pyramid shape obtained in the examples described later were layered with their first surfaces 43*a* having the recesses 22 facing the light sources 42. On the layers of the first light diffusion sheets 43, a second light diffusion sheet 44 was placed, where the second surface 44*b* as a mirror surface faces the light sources 42. The second light diffusion sheet 44 has a thickness of 120 μm and is prepared by mixing 1 part by mass of silicone composite powder (average particle diameter of 2.0 μm) as a diffusion agent with 99 parts by mass of aromatic polycarbonate resin with a melt mass flow rate of 15 g/10 min measured in compliance with ISO1133. The second light diffusion sheet 44 was manufactured through the same method as Example 1 described later, by using a mirror surface roll as one roll and a roll having a surface in a random matte shape (surface roughness Ra=2.5 μm) that is the same as Example 1 as another roll. The surface roughness Ra on the side of the matte surface (first surface 44*a*) of the second light diffusion sheet 44 was 1.6 μm, and the surface roughness Ra on the side of the mirror surface (second surface 44*b*) was 0.4 μm. On the second light diffusion sheet 44, two prism sheets 45, 46 were layered. With the above configuration, the luminance and the luminance uniformity were measured. As the LED array, one with an LED pitch of 3 mm was used. As the LEDs (small light sources 42), blue LEDs (product number XPGDRY-L1-0000-00501) manufactured by Cree LED, Inc. were used.

In the measurement of the luminance uniformity, first, the cross-sectional luminance was obtained along a diagonal line L passing directly above the LEDs (small light sources 42) of the LED array (6×6) shown in FIG. 3. Then, the average and the standard deviation of the cross-sectional luminance were calculated. The luminance uniformity was calculated according to the following formula:

$$\text{Luminance Uniformity} = (\text{Average of Cross-Sectional Luminance}) \div (\text{Standard Deviation of Cross-Sectional Luminance}).$$

The higher the value of the luminance uniformity thus obtained is, the more uniform the luminance is.

The evaluation criteria of luminance uniformity are as follows.

- AA: The light diffusion sheet exhibits the most excellent uniformity with a luminance uniformity of 210 or more. The luminance unevenness is not at all visible by visual observation.
- A: The light diffusion sheet exhibits excellent uniformity with a luminance uniformity of 200 or more and less than 210. The luminance unevenness is hardly visible by visual observation.
- B: The light diffusion sheet exhibits an acceptable level of uniformity with a luminance uniformity of 190 or more and less than 200. The luminance unevenness is slightly visible by visual observation.
- C: The light diffusion sheet exhibits a minimum acceptable level of uniformity with a luminance uniformity of 180 or more and less than 190. The luminance unevenness is visible by visual observation.
- X: The light diffusion sheet exhibits inferior uniformity, with a luminance uniformity of less than 180. The luminance unevenness is clearly visible by visual observation.

The evaluation criteria of luminance are as follows.

- A: The light diffusion sheet has an average cross-sectional luminance of 3150 cd/m$^2$ or more.
- B: The light diffusion sheet has an average cross-sectional luminance of 3100 cd/m$^2$ or more and less than 3150 cd/m$^2$.
- C: The light diffusion sheet has an average cross-sectional luminance of 3050 cd/m$^2$ or more and less than 3100 cd/m$^2$.

<Overall Evaluation>

The overall evaluation of the first light diffusion sheet 43 of each example described later was performed according to the following criteria, on the basis of the results of the scratch resistance test and the evaluation results of the luminance uniformity.

- AA: The light diffusion sheet is overall the most excellent with a rating of A or above including two or more AAs in the evaluation results of the scratch resistance tests for both of the surface with inverted square pyramids and the matte surface and the evaluation result of the luminance uniformity.
- A: The light diffusion sheet is overall the most excellent with a rating of A or above in the evaluation results of the scratch resistance tests for both of the surface with inverted square pyramids and the matte surface and the evaluation result of the luminance uniformity (Note, however, that AA-rated products are excluded).

B: The light diffusion sheet is overall excellent with a rating of B or above in the evaluation results of the scratch resistance tests for both of the surface with inverted square pyramids and the matte surface and the evaluation result of the luminance uniformity (Note, however, that AA-rated or A-rated products are excluded).

C: The light diffusion sheet overall has a minimum or higher performance with a rating of C or above in the evaluation results of the scratch resistance tests for both of the surface with inverted square pyramids and the matte surface and the evaluation result of the luminance uniformity (Note, however, that AA-rated, A-rated, or B-rated products are excluded).

X: The light diffusion sheet is poor overall, with a rating of x in any one or more of the evaluation results of the scratch resistance tests for both of the surface with inverted square pyramids and the matte surface and the evaluation result of the luminance uniformity.

Example 1

Figure 16A:
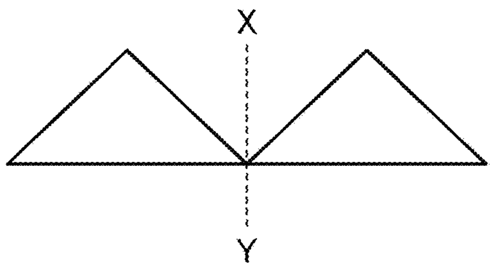
FIG. 16A-16B are views showing the shape of a square pyramid on a roll used for manufacturing the light diffusion sheets of Examples.
Figure 16B:
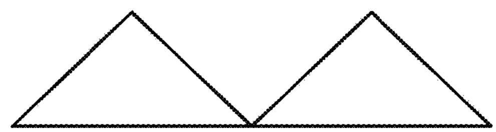

A method for manufacturing the first light diffusion sheet 43 of Example 1 is as follows. First, a polycarbonate resin (bio-engineering plastic DURABIOR D7340A manufactured by Mitsubishi Chemical Corporation, which is mainly made of plant-derived isosorbide) with a melt mass flow rate of 10 g/10 min measured in compliance with ISO1133 was input to an extruder, molten, kneaded, and then extruded from a T-die. Then, two metal rolls, one of which was a roll having on its surface shapes (square pyramids arranged in a pitch of 100 μm, each having a height of 50 μm, and a top angle of 90 degrees) shown in FIGS. 16A and 16B (FIG. 16B is a diagram showing a shape from a cross-sectional direction along the line X-Y of FIG. 16A) and the other one of which was a roll having a random matte shape (surface roughness Ra=2.5 μm), were used to sandwich the molten resin extruded from the T-die between the two rolls, so that the molten resin is cooled while the shapes of the rolls are transferred on the molten resin. This way, as shown in Table 1, a single-layered light diffusion sheet of 180 μm in thickness was manufactured by extrusion-molding. The light diffusion sheet had, on one of its surfaces, recesses in a shape of (inverted) pyramid whose depth depends on the square pyramid on the roll, and had, on its other surface, a matte surface with the surface roughness Ra=1.68 μm. Note that, regarding the molding conditions, a light diffusion sheet was obtained by performing pressurization so that the line speed was 15 m/min, the compression force (compression line pressure) between two rolls was 250 kgf/cm, at a resin temperature condition (220° C. to 260° C.) that allows favorable shape transfer on to the polycarbonate resin and that allows favorable separation from the rolls, as shown in Table 1.

TABLE 1

| | Raw materials | | | Molding method and conditions | | | | Surface roughness | Target pitch of inverted | Target top angle of inverted |
|---|---|---|---|---|---|---|---|---|---|---|
| | Resin | Resin composition | Content of diffusion agent | Molding method | Line speed m/min | Compression line pressure kgf/cm | Film thickness μm | Ra of matte surface μm | quadrangular pyrimids μm | quadrangular pyrimids Degree |
| Example 1 | D7340A | 100 | 0 | Extrusion molding | 15 | 250 | 180 | 1.68 | 100 | 90 |
| Example 2 | D7340A | 100 | 0 | Extrusion molding | 15 | 250 | 180 | 1.69 | 100 | 85 |
| Example 3 | D7340A | 100 | 0 | Extrusion molding | 15 | 250 | 180 | 1.72 | 100 | 80 |
| Comparative Example 1 | D7340A | 100 | 0 | Compression molding | — | — | 180 | 1.66 | 100 | 90 |
| Comparative Example 2 | D7340A | 100 | 0 | Compression molding | — | — | 180 | 1.66 | 100 | 85 |
| Comparative Example 3 | D7340A | 100 | 0 | Compression molding | — | — | 180 | 1.68 | 100 | 80 |
| Example 4 | D7340A | 100 | 0 | Extrusion molding | 11 | 250 | 180 | 1.64 | 100 | 90 |
| Example 5 | D7340A | 100 | 0 | Extrusion molding | 4 | 250 | 180 | 1.63 | 100 | 90 |
| Example 6 | D7340A | 100 | 0 | Extrusion molding | 15 | 150 | 180 | 1.62 | 100 | 90 |
| Comparative Example 4 | D7340A | 100 | 0 | Extrusion molding | 15 | 40 | 180 | 1.64 | 100 | 90 |

The shapes of the recesses 22 (inverted square pyramids) formed in the first light diffusion sheet 43 of Example 1 manufactured as described above were observed by using a laser microscope VK-100 manufactured by Keyence Corporation. Specifically, measurements were conducted for: the cross-sectional shape of the ridge 23 of the recess 22 formed in an inverted square pyramid (cross-sectional shapes shown in FIG. 6, FIG. 7, FIG. 9, FIG. 10); the maximum height differences dx, dy shown in FIG. 6 and FIG. 7 (the maximum distance between the straight line connecting the intersections 23*a* and the ridge 23) and their average d; the heights Hx, Hy shown in FIG. 9 and FIG. 10 (the height from the center 22*a* of the recess 22 to the top point of the ridge 23) and their average H: the dimensions Wrx, Wry shown in FIG. 9 and FIG. 10 (the dimensions occupied by the curved portion at the top portion of the ridge 23 in the X-direction and Y-direction) and their average Wr; the arrangement pitches Px, Py of the recesses 22 shown in FIG. 6 and FIG. 7 (horizontal distances between intersections 23*a* in X-direction and Y-direction) and their average P, and the ratio Wr/P (unit: %) of the dimension Wr to the arrangement pitch P; and the angles θx, θy shown in FIG. 9 and FIG. 10 (an angle formed between the sheet surface of the first light diffusion sheet 43 and the wall surfaces of the recesses 22 (inclined surfaces of the inverted square pyramid) in X-direction and Y-direction).

Examples 2 and 3

The method for manufacturing the first light diffusion sheet 43 of Example 2 adopted the same conditions as those of Example 1 as shown in Table 1, except in that a roll having square pyramid shapes arranged at a pitch of 100 μm, each having a height of 54.6 μm and a top angle of 85 degrees, was used as one of the metal rolls having the square pyramid shapes.

The method for manufacturing the first light diffusion sheet 43 of Example 3 adopted the same conditions as those of Example 1 as shown in Table 1, except in that a roll having square pyramid shapes arranged at a pitch of 100 μm, each having a height of 59.6 μm and a top angle of 80 degrees, was used as one of the metal rolls having the square pyramid shapes.

Comparative Examples 1 to 3

Figure 17A:
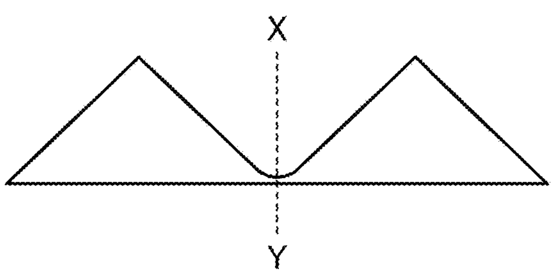
FIG. 17A-17B are views showing the shape of a square pyramid on a flat plate used for manufacturing the light diffusion sheets of Comparative Examples.
Figure 17B:
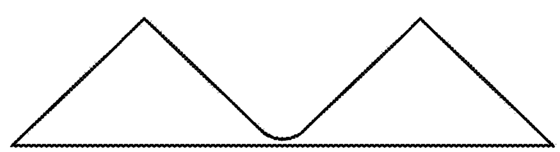

In Comparative Example 1, the same polycarbonate resin (DURABIOR D7340A) as the one used in Example 1 was used to prepare a 1 mm thick original press plate. Then, the original press plate was sandwiched between two dies and pressed for 20 minutes in a pressing machine having a heating/cooling device, at conditions of a press plate temperature of 240° C. and a surface pressure of 200 kg/cm$^2$. The two dies included: a flat plate die having, on its surface, shapes (square pyramids similar to those of Example 1 except in that the valley portion of each pyramid shape is rounded into a curved surface with a radius of curvature of 4.2 μm) as shown in FIGS. 17A and 17B (FIG. 17B is a diagram showing a shape seen from a cross-sectional direction along the line X-Y of FIG. 17A); and a flat plate die having, on its surface, the similar random matte shape (surface roughness Ra=2 μm) as Example 1. After that, the press plate temperature was cooled to 20° C. while pressurization is performed, and the pressurization is kept until the resin plate is sufficiently cooled down. This way, a light diffusion sheet of 180 μm in thickness as shown in Table 1 was manufactured through the compression molding.

In Comparative Example 2, an original press plate was manufactured in the same manner as in Comparative Example 1. Then, a light diffusion sheet of 180 μm in thickness as shown in Table 1 was manufactured through the compression molding by heating, pressurizing, and cooling with a pressing machine at the same conditions as those in Comparative Example 1, except in using a flat plate die having, on its surface, shapes (square pyramids similar to those of Example 2 except in that the valley portion of each pyramid shape is rounded into a curved surface with a radius of curvature of 4.2 μm as in the case of Comparative Example 1).

In Comparative Example 3, an original press plate was manufactured in the same manner as in Comparative Example 1. Then, a light diffusion sheet of 180 μm in thickness as shown in Table 1 was manufactured through the compression molding by heating, pressurizing, and cooling with a pressing machine at the same conditions as those in Comparative Examples 1 and 2, except in using a flat plate die having, on its surface, shapes (square pyramids similar to those of Example 3 except in that the valley portion of each pyramid shape is rounded into a curved surface with a radius of curvature of 4.2 μm as in the case of Comparative Examples 1 and 2.

Evaluation of Examples 1 to 3 and Comparative Examples 1 to 3

Figure 18:
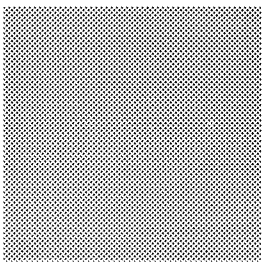
FIG. 18 is a view showing a result of scratch resistance test performed on each sample of Examples and Comparative Examples.
Figure 18:
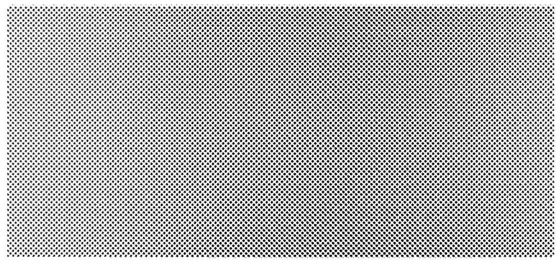
Figure 18:
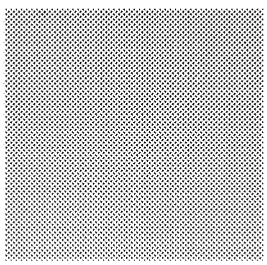
Figure 18:
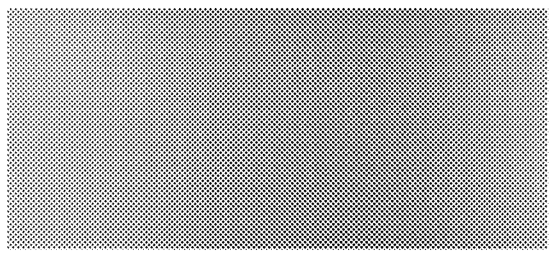
Figure 18:
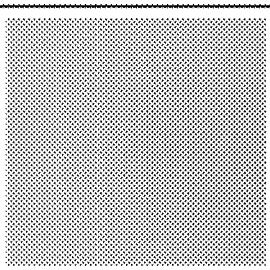
Figure 18:
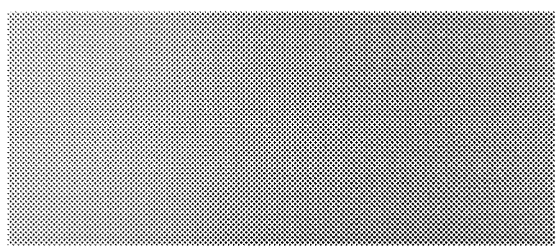
Figure 18:
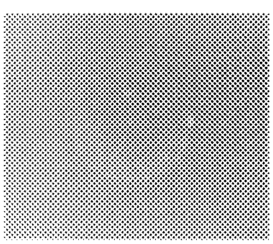
Figure 18:
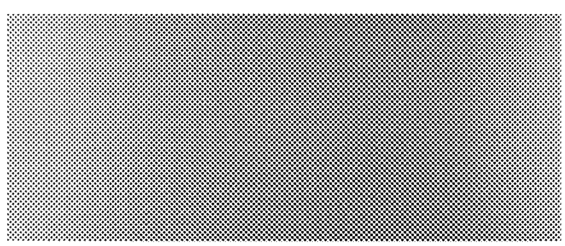

For the first light diffusion sheets 43 obtained in Examples 1 to 3, shapes, dimensions, angles, and the like obtained by the measurements are shown in Table 2 along with those of Comparative Examples 1 to 3. The measurement results of optical properties, the results of the scratch resistance tests, the evaluation results of the luminance and the luminance uniformity, as well as the overall evaluation results are shown in Table 3 along with those of Comparative Examples 1 to 3. Further, FIG. 18 shows the photographs of surfaces of the samples of Examples 1 to 3 and Comparative Example 1 after the scratch resistance test, and more specifically, shows the lower surfaces of the fixed samples (surfaces with the inverted quadrangular pyramids) and the upper surfaces of the moving samples (matte surfaces).

TABLE 2

| | Shape of inverted square pyramid | | | | | | | | |
|---|---|---|---|---|---|---|---|---|---|
| | Cross-sectional shapes of ridge along | Maximum distance d between straight lines connecting intersections and ridge | | | Vetical cross-sectional shape of ridge | Height H from center point of inverted quadrangular pyramid to highest point of center portion of ridge | | | Width Wrx, Wry of curved portion of cross-section of ridge center portion |
| | AxBx, AyBy | dx µm | dy µm | Average µm | center portion | Hx µm | Hy µm | Average H of HxHy µm | Wrx µm |
| Example 1 | Generally parabolic | 2.3 | 2.4 | 2.4 | Arc | 45.3 | 46 | 45.7 | 8.2 |
| Example 2 | Generally parabolic | 2.5 | 2.5 | 2.5 | Arc | 48.5 | 49.1 | 48.8 | 8.3 |
| Example 3 | Generally parabolic | 2.6 | 2.7 | 2.7 | Arc | 52.9 | 53.5 | 53.2 | 7.9 |
| Comparative Example 1 | Straight line | 0 | 0 | 0 | Arc | 48.2 | 48.2 | 48.2 | 6.8 |
| Comparative Example 2 | Straight line | 0 | 0 | 0 | Arc | 52.5 | 52.4 | 52.5 | 6.8 |
| Comparative Example 3 | Straight line | 0 | 0 | 0 | Arc | 57.2 | 57.1 | 57.2 | 6.8 |
| Example 4 | Generally parabolic | 2.5 | 2.7 | 2.6 | Arc | 44.5 | 44.7 | 44.6 | 8.7 |
| Example 5 | Generally parabolic | 2.0 | 2.0 | 2.0 | Arc | 43.0 | 42.8 | 42.9 | 12.8 |
| Example 6 | Generally parabolic | 2.1 | 2.3 | 2.2 | Arc | 40.0 | 40.2 | 40.1 | 18.3 |
| Comparative Example 4 | Generally parabolic | 1.7 | 1.7 | 1.7 | Arc | 26.2 | 25.6 | 25.9 | 46.0 |

| | Shape of inverted square pyramid | | | | | | | | |
|---|---|---|---|---|---|---|---|---|---|
| | Width Wrx, Wry of curved portion of cross-section of ridge center portion | | Patch P of inverted quadrangular pyramid | | | Ratio Wr/P of width Wr of curved portion to pitch P | Angle θ formed by inclined surface of inverted square pyramid and diffusion sheet surface | | |
| | Wry µm | Average Wr of W µm | Px µm | Py µm | Average P of Px, Py µm | Wr/P % | θx Degree | θy Degree | Average θ of θx, θy Degree |
| Example 1 | 7.9 | 8.1 | 99.3 | 98.9 | 99.1 | 8.1 | 44.8 | 41.8 | 44.8 |
| Example 2 | 8.5 | 8.4 | 99.1 | 99.3 | 99.2 | 8.5 | 46.7 | 46.7 | 46.7 |
| Example 3 | 7.3 | 7.6 | 99.4 | 99.3 | 99.4 | 7.6 | 49.8 | 49.6 | 49.7 |
| Comparative Example 1 | 6.9 | 6.9 | 99.4 | 99.4 | 99.4 | 6.9 | 44.1 | 44.3 | 44.2 |
| Comparative Example 2 | 6.8 | 6.8 | 99.3 | 99.5 | 99.4 | 6.8 | 46.7 | 46.7 | 46.7 |
| Comparative Example 3 | 6.7 | 6.8 | 99.4 | 99.5 | 99.5 | 6.8 | 50.1 | 50.1 | 50.1 |
| Example 4 | 8.3 | 8.5 | 99.8 | 99.6 | 99.7 | 8.5 | 44.7 | 44.8 | 44.8 |
| Example 5 | 12.6 | 12.7 | 98.9 | 99.2 | 99.1 | 12.8 | 44.6 | 44.6 | 44.6 |
| Example 6 | 18.1 | 18.2 | 98.9 | 99.2 | 99.1 | 18.4 | 44.7 | 44.8 | 44.8 |
| Comparative Example 4 | 45.6 | 45.8 | 99.3 | 99.3 | 99.3 | 46.1 | 45.2 | 45.2 | 45.2 |

TABLE 3

| | Optical properties | | Evaluation of physical properties | | | | |
|---|---|---|---|---|---|---|---|
| | Haze (Light from surface with inverted quadrangular pyramids) % | Light transmittance (450 nm) (Light from surface with inverted quadrangular pyramids) % | Scratch resistance test: Surface with inverted quadrangular pyramids | Scratch resistance test: Matte surface | Luminance uniformity | Luminance | Overall evaluation |
| Example 1 | 92.2 | 98.8 | B | AA | B | B | B |
| Examle 2 | 92.4 | 101.3 | A | AA | A | B | A |
| Comparative Example 1 | 92.3 | 98.7 | X | AA | A | C | X |
| Comparative Example 2 | 92.5 | 101.4 | X | AA | AA | B | X |
| Comparative Example 3 | 92.9 | 107.8 | X | AA | AA | A | X |
| Example 4 | 92.7 | 99.4 | A | AA | B | B | B |
| Example 5 | 93.0 | 99.8 | B | AA | C | B | C |
| Example 6 | 93.1 | 100.8 | B | AA | C | B | C |
| Comparative Example 4 | 92.9 | 105.4 | C | AA | X | B | X |

It should be understood from the results shown in Table 2 and Table 3 that, in the first light diffusion sheets 43 obtained in Examples 1 to 3, having recesses 22 formed in an inverted square pyramid shape, the maximum height difference d between the straight line connecting the intersections 23*a* and the ridge 23 is 1.0 μm or more, and the ridge 23 between the intersections 23*a* has a generally parabolically recessed shape. Therefore, wear and damage attributed to the ridge 23 are less likely even if any of these first light diffusion sheets 43 is layered and used with another optical sheet, consequently yielding favorable results in the scratch resistance test not only for the matte surfaces (the upper surfaces of the moving samples) but also for the surfaces with inverted quadrangular pyramids (the lower surfaces of the fixed samples), as shown in FIG. 18.

In Comparative Examples 1 to 3, on the other hand, the maximum height difference d is 0 μm, resulting in a horizontal shape of the ridge 23 between the intersections 23*a* without a recessed portion of the ridge 23, despite the presence of the curved surface with the radius of curvature of approximately 4.2 μm near the top point of the ridge 23. Therefore, as shown in FIG. 18, the surface with the inverted quadrangular pyramids (lower surface of the fixed sample) had scratches attributed to the ridges 23 in the scratch resistance test, resulting in inferior scratch resistance.

Further, the ratio Wr/P is 10% or less and the steep top portion of the ridge 23 is maintained, resulting in favorable luminance uniformity in each of Example 1 and Comparative Example 1, Example 2 and Comparative Example 2, and Example 3 and Comparative Example 3.

Based on the above results, Example 1 was rated "B," Example 2 was rated "A," Example 3 was rated "AA," while Comparative Examples 1 to 3 were rated "X" in their overall evaluations.

Examples 4 to 6 and Comparative Example 4

In Examples 4 and 5, a light diffusion sheet was manufactured through the same method as Example 1 except in that the line speed out of the molding conditions was changed to 11 m/min and 4 m/min, respectively, as shown in Table 1.

In Example 6 and Comparative Example 4, a light diffusion sheet was manufactured through the same method as Example 1 except in that the compression line pressure between two rolls was changed to 150 kgf/cm and 40 kgf/cm, respectively, as shown in Table 1.

Evaluation of Examples 4 to 6 and Comparative Example 4

For the first light diffusion sheets 43 obtained in Examples 4 to 6, shapes, dimensions, angles, and the like of the elements obtained by the measurements are shown in Table 2 along with those of Comparative Example 4. The measurement results of optical properties, the results of the scratch resistance tests, the evaluation results of the luminance and the luminance uniformity, as well as the overall evaluation results are shown in Table 3 along with those of Comparative Example 4.

It should be understood from the results shown in Table 2 and Table 3 that, in the first light diffusion sheets 43 obtained in Examples 4 to 6 and Comparative Example 4, having recesses 22 formed in an inverted square pyramid shape, the maximum height difference d between the straight line connecting the intersections 23*a* and the ridge 23 is 1.0 μm or more, and the ridge 23 between the intersections 23*a* has a generally parabolically recessed shape. Therefore, wear and damage attributed to the ridge 23 are less likely even if any of these first light diffusion sheets 43 is layered and used with another optical sheet, consequently yielding favorable results in the scratch resistance test.

Further, the ratio Wr/P is 30% or less and the steep top portion of the ridge 23 is maintained, resulting in favorable luminance uniformity in each of Examples 4 to 6.

However, the ratio Wr/P exceeds 30% and the steep top portion of the ridge 23 is not maintained, resulting in inferior luminance uniformity, in Comparative Example 4.

Based on the above results, Example 4 was rated "B," Examples 5 and 6 were rated "C," while Comparative Example 4 was rated "X" in their overall evaluations.

Examples 7 to 9 and Comparative Example 5

The method for manufacturing the first light diffusion sheet 43 of Example 7 adopted almost the same conditions as those of Example 1, except in that a roll having square pyramid shapes arranged at a pitch of 180 μm, each having a height of 90.0 μm and a top angle of 90 degrees, was used as one of the two metal rolls having the square pyramid shapes, to manufacture a light diffusion sheet of 200 μm in thickness as shown in Table 4.

TABLE 4

| | Raw materials | | | Molding method and conditions | | | | Surface roughness Ra of matte surface µm | Target pitch of inverted quadrangular pyramids µm | Target top angle of inverted quadrangular pyramid Degree |
|---|---|---|---|---|---|---|---|---|---|---|
| | Resin | Resin composition | Content of diffusion agent | Molding method | Line speed m/min | Compression line pressure kgf/cm | Film thickness µm | | | |
| Example 7 | D7340A | 100 | 0 | Extrusion molding | 15 | 250 | 200 | 1.60 | 180 | 90 |
| Example 8 | D7340A | 100 | 0 | Extrusion molding | 15 | 250 | 200 | 1.63 | 180 | 85 |
| Example 9 | D7340A | 100 | 0 | Extrusion molding | 15 | 250 | 200 | 1.64 | 180 | 80 |
| Comparative Example 5 | D7340A | 100 | 0 | Compression molding | — | — | 200 | 1.64 | 180 | 90 |

The method for manufacturing the first light diffusion sheet 43 of Example 8 adopted almost the same conditions as those of Example 1, except in that a roll having square pyramid shapes arranged at a pitch of 180 µm, each having a height of 98.2 µm and a top angle of 85 degrees, was used as one of the two metal rolls having the square pyramid shapes, to manufacture a light diffusion sheet of 200 µm in thickness as shown in Table 4.

The method for manufacturing the first light diffusion sheet 43 of Example 9 adopted almost the same conditions as those of Example 1, except in that a roll having square pyramid shapes arranged at a pitch of 180 µm, each having a height of 107.3 µm and a top angle of 80 degrees, was used as one of the two metal rolls having the square pyramid shapes, to manufacture a light diffusion sheet of 200 µm in thickness as shown in Table 4.

In Comparative Example 5, an original press plate was manufactured in the same manner as in Comparative Example 1. Then, a light diffusion sheet of 200 µm in thickness as shown in Table 4 was manufactured through the compression molding by heating, pressurizing, and cooling with a pressing machine at the same conditions as those in Comparative Example 1, except in using a flat plate die having, on its surface, shapes (square pyramids similar to those of Example 7 except in that the valley portion of each pyramid shape is rounded into a curved surface with a radius of curvature of 4.2 µm as in the case of Comparative Example 1.

Evaluation of Examples 7 to 9 and Comparative Example 5

For the first light diffusion sheets 43 obtained in Examples 7 to 9, shapes, dimensions, angles, and the like of the elements obtained by the measurements are shown in Table 5 along with those of Comparative Example 5. The measurement results of optical properties, the results of the scratch resistance tests, the evaluation results of the luminance and the luminance uniformity, as well as the overall evaluation results are shown in Table 6 along with those of Comparative Example 5.

TABLE 5

| | Shape of inverted square pyramid | | | | | | | | | | |
|---|---|---|---|---|---|---|---|---|---|---|---|
| | Cross-sectional shapes of ridge along AxBx, AyBy | Maximum distance d between straight lines connecting intersections and ridge | | | Vertical cross-sectional shape of ridge center portion | Height H from center point of inverted quadrangular pyramid to highest point of center portion of ridge | | | Width Wrx, Wry of curved portion of cross-section of ridge center portion | | |
| | | dx µm | dy µm | Average µm | | Hx µm | Hy µm | Average H of HxHy µm | Wrx µm | Wry µm | Average Wr of W µm |
| Example 7 | Generally parabolic | 3.1 | 3.1 | 3.1 | Arc | 84.1 | 83.7 | 83.9 | 11.5 | 11.1 | 11.3 |
| Example 8 | Generally parabolic | 3.6 | 3.5 | 3.6 | Arc | 90.1 | 90.2 | 90.2 | 11.6 | 11.2 | 11.4 |
| Example 9 | Generally parabolic | 3.9 | 3.9 | 3.9 | Arc | 99.1 | 99.3 | 99.2 | 11.2 | 10.8 | 11.0 |
| Comparative Example 5 | Straight line | 0 | 0 | 0 | Arc | 87.3 | 86.8 | 87.1 | 9.6 | 9.9 | 9.8 |

| | Shape of inverted square pyramid | | | | | | |
|---|---|---|---|---|---|---|---|
| | Pitch P of inverted quadrangular pyramid | | | Ratio Wr/P of width Wr of curved portion to pitch P | Angle θ formed by inclined surface of inverted square pyramid and diffusion sheet surface | | |
| | Px µm | Py µm | Average P of Px, Py µm | Wr/P % | θx Degree | θy Degree | Average θ of θx, θy Degree |
| Example 7 | 187.3 | 185.5 | 186.4 | 6.1 | 45.1 | 45.0 | 45.1 |
| Example 8 | 187.3 | 186.6 | 187.0 | 6.1 | 47.2 | 47.1 | 47.2 |

TABLE 5-continued

| | | | | | | | | |
|---|---|---|---|---|---|---|---|---|
| | Example 9 | 185.5 | 186.8 | 186.2 | 5.9 | 49.6 | 49.6 | 49.6 |
| | Comparative Example 5 | 185.6 | 186.0 | 185.8 | 5.2 | 44.9 | 44.9 | 44.9 |

TABLE 6

| | Optical properties | | Evaluation of physical properties | | | | |
|---|---|---|---|---|---|---|---|
| | Haze | Light transmittance (450 nm) | Scratch resistance test | | | | |
| | (Light from surface with inverted quadrangular pyramids) % | (Light from surface with inverted quadrangular pyramids) % | Surface with inverted quad-rangular pyramids | Matte surface | Luminance uniformity | Luminance | Overall evaluation |
| Example 7 | 92.9 | 97.9 | A | AA | AA | B | AA |
| Example 8 | 93.1 | 102.0 | A | AA | AA | B | AA |
| Example 9 | 93.3 | 114.4 | A | AA | AA | A | AA |
| Comparative Example 5 | 93.0 | 98.1 | X | AA | AA | B | X |

It should be understood from the results shown in Table 5 and Table 6 that, in the first light diffusion sheets 43 obtained in Examples 7 to 9, having recesses 22 formed in an inverted square pyramid shape, the maximum height difference d between the straight line connecting the intersections 23*a* and the ridge 23 is 2.5 μm or more, and the ridge 23 between the intersections 23*a* has a generally parabolically recessed shape. Therefore, wear and damage attributed to the ridge 23 are even less likely even if any of these first light diffusion sheets 43 is layered and used with another optical sheet, consequently yielding the most favorable results in the scratch resistance test among the examples.

In Comparative Example 5, on the other hand, the maximum height difference d is 0 μm, resulting in a horizontal shape of the ridge 23 between the intersections 23*a* without a recessed portion of the ridge 23, despite the presence of the curved surface near the top point of the ridge 23. Therefore, scratches attributed to the ridge 23 take place in the scratch resistance test, resulting in inferior scratch resistance.

Further, the ratio Wr/P is 10% or less and an even steeper top portion of the ridge 23 is maintained, resulting in significantly favorable luminance uniformities, in Examples 7 to 9 and Comparative Example 5. Particularly in Examples 7 to 9, a drop in the luminance uniformity attributed to the recessed shape of the ridge 23 between the intersections 23*a* was not visible, because the maximum height difference d was 5.0 μm or less.

Based on the above results, Examples 7 to 9 were rated "AA" and were the most excellent, while Comparative Example 5 was rated "X" in their overall evaluations.

Examples 10 to 12

In Example 10, a polycarbonate resin (bio-engineering plastic DURABIO® D7340A manufactured by Mitsubishi Chemical Corporation, which is mainly made of plant-derived isosorbide) with a melt mass flow rate of 5 g/10 min measured in compliance with ISO1133 was used. Also, the same two rolls as those of Example 1 were used, except in that 1 part by mass of silicone composite powder (average particle diameter of 2.0 μm) as a diffusion agent was mixed in advance with 99 parts by mass of polycarbonate resin, and the mixture was supplied to an extruder to perform melting and kneading. Then, pressurization was performed so that the line speed was 17 m/min, the compression force (compression line pressure) between the two rolls was 280 kgf/cm as shown in Table 7. Accordingly, a light diffusion sheet of 180 μm in thickness was obtained at a resin temperature condition (220° C. to 260° C.) that allows favorable shape transfer on to the polycarbonate resin and that allows favorable separation from the rolls.

TABLE 7

| | Raw materials | | | Molding method and conditions | | | | Surface roughness Ra of | Target pitch of inverted | Target top angle of inverted |
|---|---|---|---|---|---|---|---|---|---|---|
| | Resin | Resin composition | Content of diffusion agent | Molding method | Line speed m/min | Compression line pressure kgf/cm | Film thickness μm | matte surface μm | quadrangular pyramids μm | quadrangular pyramid Degree |
| Example 10 | D5380A | 99.0 | 1.0 | Extrusion molding | 17 | 280 | 180 | 1.61 | 100 | 90 |
| Example 11 | D5380A | 99.0 | 1.0 | Extrusion molding | 15 | 280 | 180 | 1.62 | 100 | 90 |
| Example 12 | D5380A | 99.0 | 1.0 | Extrusion molding | 13 | 280 | 180 | 1.64 | 100 | 90 |

In Examples 11 to 12, a light diffusion sheet of 180 μm in thickness was manufactured by using the same method as that used in Example 10 with the line speed out of the molding conditions changed to 15 m/min and 13 m/min, respectively, as shown in Table 7.

Evaluation of Examples 10 to 12

For the first light diffusion sheets 43 obtained in Examples 10 to 12, shapes, dimensions, angles, and the like of the elements obtained by the measurements are shown in Table 8. The measurement results of optical properties, the results of the scratch resistance tests, the evaluation results of the luminance and the luminance uniformity, as well as the overall evaluation results are shown in Table 9.

TABLE 8

| | Shape of inverted square pyramid | | | | | | | | | | |
|---|---|---|---|---|---|---|---|---|---|---|---|
| | Cross-sectional shapes of ridge along AxBx, AyBy | Maximum distance d between straight lines connecting intersections and ridge: dx µm | dy µm | Average µm | Vertical cross-sectional shape of ridge center portion | Height H from center point of inverted quadrangular pyramid to highest point of center portion of ridge: Hx µm | Hy µm | Average H of HxHy µm | Width Wrx, Wry of curved portion of cross-section of ridge center portion: Wrx µm | Wry µm | Average Wr of W µm |
| Example 10 | Generally parabolic | 2.1 | 1.9 | 2.0 | Arc | 45.5 | 45.6 | 45.6 | 8.0 | 7.8 | 7.9 |
| Example 11 | Generally parabolic | 2.2 | 2.3 | 2.3 | Arc | 44.9 | 44.8 | 44.9 | 8.3 | 8.0 | 8.2 |
| Example 12 | Generally parabolic | 2.4 | 2.4 | 2.4 | Arc | 44.8 | 44.7 | 44.8 | 8.6 | 8.8 | 8.7 |

| | Shape of inverted square pyramid | | | | | | |
|---|---|---|---|---|---|---|---|
| | Pitch P of inverted quadrangular pyramid: Px µm | Py µm | Average P of Px, Py µm | Ratio Wr/P of width Wr of curved portion to pitch P Wr/P % | Angle θ formed by inclined surface of inverted square pyramid and diffusion sheet surface: θx Degree | θy Degree | Average θ of θx, θy Degree |
| Example 10 | 99.7 | 99.6 | 99.7 | 7.9 | 44.3 | 44.7 | 44.5 |
| Example 11 | 99.3 | 99.2 | 99.3 | 8.2 | 44.8 | 44.8 | 44.8 |
| Example 12 | 99.1 | 99.1 | 99.1 | 8.8 | 44.8 | 44.9 | 44.9 |

TABLE 9

| | Optical properties | | Evaluation of physical properties | | | | |
|---|---|---|---|---|---|---|---|
| | Haze | Light transmittance (450 nm) | Scratch resistance test | | | | |
| | (Light from surface with inverted quadrangular pyramids) % | (Light from surface with inverted quadrangular pyramids) % | Surface with inverted quad-rangular pyramids | Matte surface | Luminance uniformity | Luminance | Overall evaluation |
| Example 10 | 94.5 | 89.0 | B | AA | B | B | B |
| Example 11 | 94.3 | 89.4 | B | AA | C | B | C |
| Example 12 | 94.4 | 89.6 | B | AA | C | B | C |

It should be understood from the results shown in Table 8 and Table 9 that, in the first light diffusion sheets 43 obtained in Examples 10 to 12, having recesses 22 formed in an inverted square pyramid shape, the maximum height difference d between the straight line connecting the intersections 23*a* and the ridge 23 is 2.0 µm or more, and the ridge 23 between the intersections 23*a* has a generally parabolically recessed shape. Therefore, wear and damage attributed to the ridge 23 are less likely even if any of these first light diffusion sheets 43 is layered and used with another optical sheet, consequently yielding favorable results in the scratch resistance test.

Further, the ratio Wr/P is within a range from 6% to 9% and the steep top portion of the ridge 23 is maintained, resulting in favorable luminance uniformity, in each of Examples 10 to 12.

Based on the above results, Example 10 was rated "B," and Examples 11 and 12 were rated "C."

Other Embodiments

The above describes embodiments (including examples: the same applies hereinafter) of the present disclosure. However, the present disclosure is not limited only to the aforementioned embodiments, and various modifications are possible within the scope of the disclosure. That is, the above description of the embodiments is solely to serve as an example in nature, and is not intended to limit the present disclosure, applications thereof, or uses thereof. For example, it is needless to say that the configuration of the light diffusion sheet (layer structures, material, and the like) is not limited to that of the first light diffusion sheet 43 of the above-described embodiment. It is further needless to say that the configurations of the backlight to which the above light diffusion sheet is applied and the liquid crystal display device having such a backlight are also not limited to the configurations of the backlight unit 40 and the liquid crystal display device 50 of the above-described embodiment.

Figure 19:
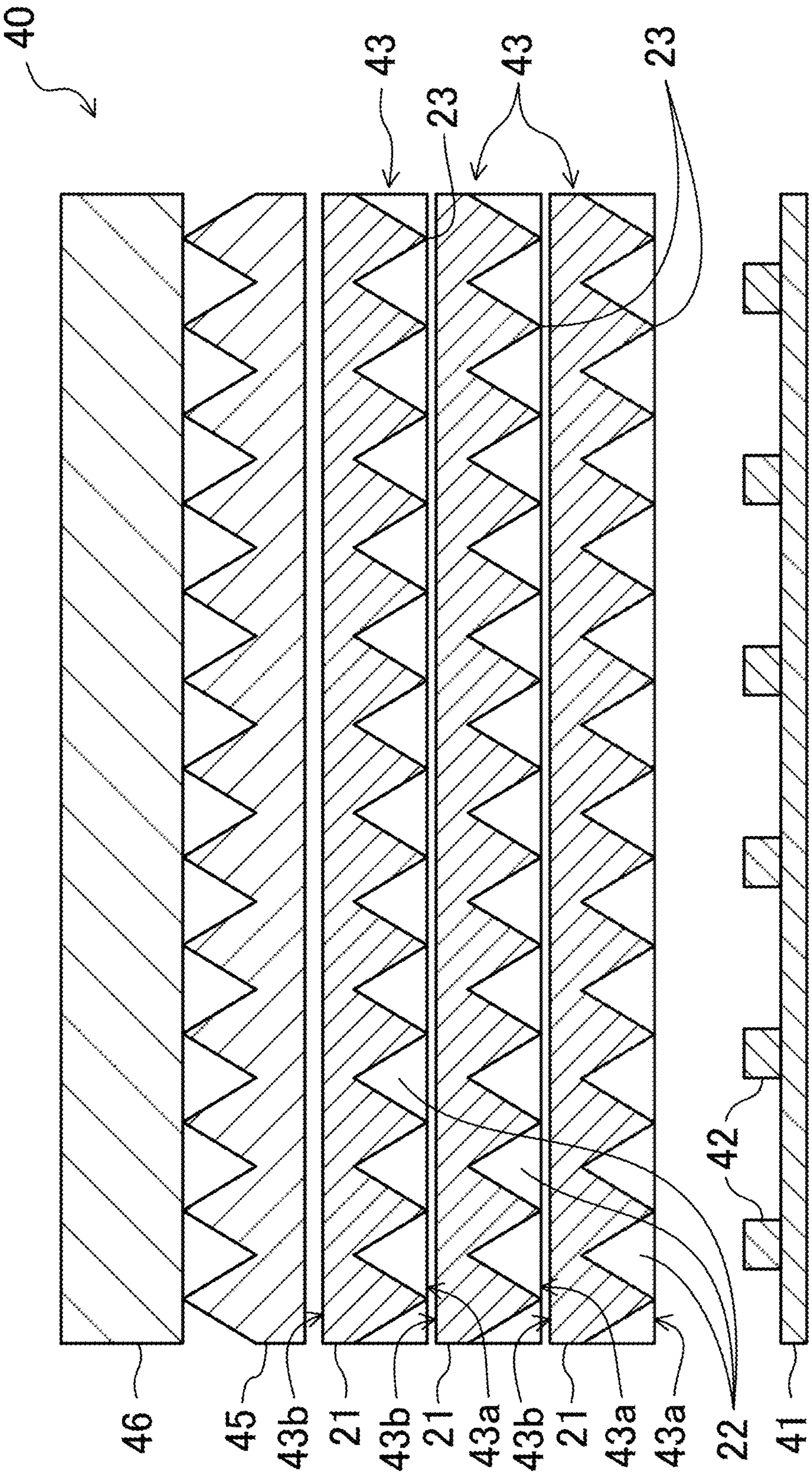
FIG. 19 is a cross-sectional view of a backlight unit of a modification.

For example, instead of the backlight unit 40 of the above-described embodiment shown in FIG. 2 including combination of two layers of first light diffusion sheets 43 and the second light diffusion sheet 44, three layers of the first light diffusion sheets 43 may be used as in the case of the backlight unit 40 of the modification shown in FIG. 19, or four or more first light diffusion sheets 43 may be layered. In a case of layering three or more first light diffusion sheets 43, the light diffusion sheet 43 closest to the display screen 50*a* (i.e., the first prism sheet 45) may contain a diffusion agent, while the other light diffusion sheets 43 may not substantially contain a diffusion agent, in terms of a trade-off between the effect of reflection and refraction by the substantially inverted polygon pyramid shapes with the light diffusion effect by the diffusion agent. This way, the luminance uniformity can be yet further improved.

The invention claimed is:

1. A light diffusion sheet comprising, at least in its first surface, a plurality of recesses formed in a substantially inverted polygon pyramid or in a substantially inverted truncated polygon pyramid, wherein the light diffusion sheet includes a homopolymerized polycarbonate resin composed of a first structural unit derived from a dihydroxy compound represented by the following formula (1), or a copolymerized polycarbonate resin composed of the first structural unit and a second structural unit derived from one or more dihydroxy compounds selected from a group consisting of aliphatic dihydroxy compounds, alicyclic dihydroxy compounds, and ether group-containing dihydroxy compounds (excluding the dihydroxy compound represented by the following formula (1)), a ridge parting the plurality of recesses has a recessed shape between intersections of the ridge, with respect to a straight line connecting the intersections, a ratio Wr/P is 0.3 or less, where P is an arrangement pitch of the plurality of recesses and Wr is a dimension occupied by a curved portion at a top portion of the ridge in an arrangement direction of the plurality of recesses, and a maximum height difference d between the straight line and the ridge is 1 μm or more and 10 μm or less.

(1)

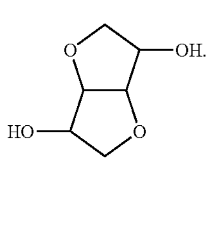

2. The light diffusion sheet of claim 1, wherein the maximum height difference d is 1.5 μm or more and 7 μm or less.

3. The light diffusion sheet of claim 2, wherein the maximum height difference d is 2.5 μm or more and 5 μm or less.

4. The light diffusion sheet of claim 1, wherein the ratio Wr/P is 0.2 or less.

5. The light diffusion sheet of claim 4, wherein the ratio Wr/P is 0.1 or less.

6. The light diffusion sheet of claim 1, wherein the arrangement pitch P is 50 μm or more and 500 μm or less, and an angle formed between a wall surface of each of the plurality of recesses and a sheet surface of the light diffusion sheet is 40 degrees or more and 65 degrees or less.

7. The light diffusion sheet of claim 1, wherein the ridge between the intersections is recessed in a substantially parabolic shape, a substantially arc shape, a substantially triangular shape, or a substantially trapezoidal shape.

8. The light diffusion sheet of claim 1, wherein the plurality of recesses are each formed in a substantially inverted quadrangular pyramid or a substantially inverted truncated quadrangular pyramid shape, the ridge extends in a first direction and a second direction, the maximum height difference d is an average of a maximum height difference dx between the straight line and the ridge in the first direction and a maximum height difference dy between the straight line and the ridge in the second direction, the arrangement pitch P is an average of an arrangement pitch Px of the plurality of recesses in the first direction and an arrangement pitch Py of the plurality of recesses in the second direction, and the dimension Wr is an average of a dimension Wrx occupied by the curved portion at the top portion of the ridge in the first direction and a dimension Wry occupied by the curved portion at the top portion of the ridge in the second direction.

9. The light diffusion sheet of claim 1, wherein the plurality of recesses are provided only in the first surface, and the second surface is a matte surface.

10. A backlight unit built in a liquid crystal display device and leading light emitted from light sources toward a display screen, comprising:

the light diffusion sheet of claim 1 provided between the display screen and the light sources.

11. The backlight unit of claim 10, wherein the light sources are arranged on a reflective sheet provided on an opposite side of the display screen as seen from the light diffusion sheet.

12. The backlight unit of claim 10, wherein the light diffusion sheet includes a plurality of light diffusion sheets layered and arranged between the display screen and the light sources.

13. The backlight unit of claim 12, wherein the light diffusion sheet includes three or more light diffusion sheets layered and arranged between the display screen and the light sources.

14. The backlight unit of claim 13, wherein of the three or more light diffusion sheets, the light diffusion sheet closest to the display screen contains a diffusion agent, and the other light diffusion sheets do not substantially contain a diffusion agent.

15. A liquid crystal display device, comprising:

the backlight unit of claim 10; and a liquid crystal display panel.

16. An information apparatus, comprising:

the liquid crystal display device of claim 15.

17. A method of manufacturing the light diffusion sheet of claim 1, comprising:

extrusion-molding of the light diffusion sheet at a line speed of 10 m/min or more and 30 m/min or less, with a compression line pressure of 100 kgf/cm or more and 500 kgf/cm or less.

* * * * *